(12) United States Patent
Dehmubed et al.

(10) Patent No.: US 11,030,508 B2
(45) Date of Patent: Jun. 8, 2021

(54) PACKAGING SYSTEM WITH CODE-BASED DETECTION OF PRODUCT FALSIFICATION

(71) Applicant: eTEP Inc., San Francisco, CA (US)

(72) Inventors: Rohinton S. Dehmubed, San Francisco, CA (US); Peter Gompper, San Francisco, CA (US)

(73) Assignee: eTEP Inc., San Francisco, CA (US)

( * ) Notice: Subject to any disclaimer, the term of this patent is extended or adjusted under 35 U.S.C. 154(b) by 33 days.

(21) Appl. No.: 16/449,242

(22) Filed: Jun. 21, 2019

(65) Prior Publication Data

US 2020/0401867 A1    Dec. 24, 2020

(51) Int. Cl.
*G06K 19/077*    (2006.01)

(52) U.S. Cl.
CPC .  *G06K 19/07722* (2013.01); *G06K 19/07758* (2013.01); *G06K 19/07798* (2013.01)

(58) Field of Classification Search
CPC ................... G06K 19/07722; G06K 19/07758
USPC ........................................ 235/488; 340/10.42
See application file for complete search history.

(56) References Cited

U.S. PATENT DOCUMENTS

| | | |
|---|---|---|
| 5,294,470 A | 3/1994 | Ewan |
| 6,063,503 A | 5/2000 | Hatakeyama et al. |
| 6,287,965 B1 | 9/2001 | Kang et al. |
| 6,391,407 B1 | 5/2002 | Kashiba et al. |
| 7,170,409 B2 | 1/2007 | Ehrensvard et al. |
| 7,570,169 B2 | 8/2009 | Li et al. |

(Continued)

FOREIGN PATENT DOCUMENTS

| | | |
|---|---|---|
| WO | 2008071406 A1 | 6/2008 |
| WO | WO2017/024281 A1 | 2/2017 |

OTHER PUBLICATIONS

Circus Tamper Loop: A New Digital Seal for Your Products; Smartrac N.V. Oct. 2018.

(Continued)

*Primary Examiner* — Allyson N Trail
(74) *Attorney, Agent, or Firm* — Gordon & Jacobson, P.C.

(57) ABSTRACT

A packaging system for at least one article includes a multilayer laminate structure that encapsulates a transformative material between first and second conductive layers where one of the first and second conductive layers defines a set of elongate sections. An NFC/RFID IC is electrically coupled to an antenna. The NFC/RFID IC has a plurality of input terminals electrically coupled to a plurality of electrical circuits that provide for electrical connection or electrical disconnection between sections in the set of elongate sections in accordance with a predefined codeword. The NFC/RFID IC is configured to sense voltage signals produced by the plurality of electrical circuits, determine a sensed codeword based on the sensed voltage signals, compare the sensed codeword to the predefined codeword, and output a signal based on such comparison. The predefined codeword can be associated with the packaging system for the at least one article or the at least one article, and the output signal output can be related to suspected counterfeiting or falsification of the at least one article. The NFC/RFID IC or an additional NFC/RFID IC can be configured to detect and register an intrusion or perforation in the multilayer laminate structure that relates to suspected tampering.

39 Claims, 23 Drawing Sheets

(56) References Cited

U.S. PATENT DOCUMENTS

| | | |
|---|---|---|
| 9,494,541 B2 | 11/2016 | Potyrailo et al. |
| 10,323,373 B2 | 6/2019 | Dehmubed et al. |
| 2004/0066296 A1 | 4/2004 | Atherton |
| 2005/0011163 A1 | 1/2005 | Ehrensvard et al. |
| 2005/0093677 A1 | 5/2005 | Forster et al. |
| 2008/0223936 A1 | 9/2008 | Mickle et al. |
| 2009/0184824 A1 | 7/2009 | Forster |
| 2010/0060432 A1 | 3/2010 | Van Niekerk et al. |
| 2010/0289627 A1* | 11/2010 | McAllister .............. G06F 21/44 340/10.42 |
| 2010/0323925 A1 | 12/2010 | Gabriel et al. |
| 2011/0011179 A1 | 1/2011 | Gustafsson et al. |
| 2011/0236703 A1 | 9/2011 | McGee |
| 2011/0239450 A1 | 10/2011 | Basol et al. |
| 2011/0285507 A1 | 11/2011 | Nelson |
| 2012/0278676 A1 | 11/2012 | Teraura |
| 2013/0008332 A1 | 1/2013 | Nair et al. |
| 2013/0068842 A1 | 3/2013 | Kuo et al. |
| 2013/0135104 A1 | 5/2013 | Nikkanen |
| 2016/0012310 A1 | 1/2016 | Kozicki |
| 2016/0192188 A1 | 6/2016 | Coulier |
| 2016/0300240 A1 | 10/2016 | Bright et al. |
| 2016/0349088 A1 | 12/2016 | Patel |
| 2017/0058565 A1* | 3/2017 | Sanchez .................... A61J 1/00 |
| 2020/0250908 A1* | 8/2020 | Shah .................. H04L 63/0428 |

OTHER PUBLICATIONS

Flexure-based Roll-to-roll Platform: A Practical Solution for Realizing Large-area Microcontact Printing, Xi Zhou et al., Scientific Reports, 5:10402; Jun. 3, 2015.

Inkjet-Printed Humidity Sensor for Passive UHD RFID Systems, Juha Virtanen et al., IEEE Transactions on Instrumentation and Measurement, vol. 60 No. 8, Aug. 2011.

A Wireless Passive Humidity Threshold Monitoring Solution Based on a Permanent Resistance Change, Sebastian Sauer et al., Procedia Engineering 87 (2014) 688-691.

International Search Report and Written Opinion dated Sep. 4, 2020 of Application No. PCT/US 20/38593.

* cited by examiner

PACKAGING SYSTEM WITH CODE-BASED DETECTION OF PRODUCT FALSIFICATION

BACKGROUND

1. Field

The present disclosure relates to packaging solutions that can verify and validate package integrity and detect multiple forms of product falsification, including counterfeiting and other forms of product falsification as well as intrusion of package integrity (for example, due to tampering or siphoning). The present disclosure also relates to packaging solutions that can provide information regarding package integrity and falsification for track-and-trace services throughout a supply chain.

2. State of the Art

The trade in counterfeit, imitation and falsified products is estimated at five percent to seven percent of overall world trade, which is greater than $600 billion per annum. Counterfeit and falsified products (including intrusion and tamper events, such as an unauthorized opening or modification to one or more packaged items) are major concerns when sourcing supplies, and manufacturing, handling, storing, shipping and selling products such as medication and other valuable or sensitive items. Counterfeit, imitation and falsified Products are major problems in several industries including drinks, foods, refined chemicals, nuclear power, and across brand-name, lifestyle/personal, and luxury goods. The theft of intellectual property and financial damage to producers and employees (in lost product revenue or personal income) and governments (in lost tax revenue) is only one aspect of the problem. There are also significant and real health risks due to counterfeit medication and the use of harmful chemicals.

For instance, legitimate medicines are produced under highly controlled and regulated conditions using good manufacturing practices (GMP) and good distribution practices (GDP). International quality standards ensure patients consume only safe and effective products which are registered or licensed. Falsified products in the medical field are fake (e.g., unregistered or unlicensed medical products), passed-off as legitimate authorized medicines or medical devices, and are typically ineffective, adulterated products or toxic. The magnitude of falsified products in the medical field is significant, with approximately ten percent of pharmaceuticals in the global chain being falsified, and frequency of sale in developing countries particularly high, e.g., Latin America (30%), Africa (50%), and the former Soviet Union (20%). The European Union (EU), the United States (USA), and other countries have strong legal frameworks for the licensing, manufacturing and distribution of medicines. In the USA, the Drug Supply Chain Security Act (DSCSA) was enacted to provide a uniform national track-and-trace system for prescription drugs—an interoperable system in which manufacturers and re-packagers are required to include a unique product identifier (2-D barcode), lot number and expiration date to prescription-drug packaging for full product tracking across the supply chain by 2023. Importantly, the impact will be felt equally in other countries which export to the United States. In the EU, the European Commission published a regulation that requires use of two safety features placed on the packaging of most human medicines: a unique identifier (or 2-dimension barcode) and an anti-tampering device.

Marketing authorization holders (or manufacturers) must place these on the packaging of most prescription medicines and certain non-prescription medicines no later than 9 Feb. 2019. The intention of such safety features is to guarantee authenticity of medicine for the benefit of patients and businesses and to strengthen the security of the medicine supply chain; from the sourcing of active and incipient products to the manufacturing and distribution at pharmacy and hospital.

Pharmaceutical executives point to special packaging as a promising instrument for the detection and removal of counterfeit products from the supply chain of medicines and medical devices, especially those sold online, as regulations address all points along the supply chain (except that of the consumer at point-of-sale) as product authenticators. However, packaging technologists are challenged by nefarious actors who 'game' and infiltrate vulnerable porous supply chains, as the routes of medical products from manufacturers to consumers can be long and circuitous. With increased transnational outsourcing of medical production, from the procurement of key and incipient ingredients to the final stages of assembly and distribution, criminals capitalize on the weaknesses or negligence of material processing. In addition, the majority of manufacturing occurs in countries with minimal consumer protection and product liability laws. Also, numerous secondary wholesalers, retailers and re-packagers constitute extra layers in distribution networks, allowing for the diversion of legitimate medicine and the . entry of falsified medicines. Pharmaceutical manufacturers who have been inspected with few or no regulatory warnings by the U.S. Food and Drug Administration (e.g., FDA 483s) may potentially also be involved in producing and distributing substandard medicines, possibly due to unintentional manufacturing negligence or due to inappropriate handling during transport and storage, or the manufacture of Over-run products. Inspections of a facility by the FDA is data-dependent, and includes compliance history, recall trends, time since last inspection, inherent risk of the drug being manufactured, processing complexity and other factors. Also, medicines manufactured for export from developed countries to developing countries often fail GMP standards when the product is for domestic use, or fail to provide correct packaging and labeling regarding sterility (e.g., for needle-type products) including misbranding errors in product labeling, manufacturing defects, failures to follow GMP, or missing parts or product performance failures. In addition, "parallel production" in the same GMP-compliant facilities allows for production of high, intermediate and low standard materials for the three different markets: strictly regulated, middle-income, poorly-regulated, respectively, without awareness by the consumer. Furthermore, policing agencies (e.g., WHO, UNODC, Interpol, etc.) lack evidenced-based data upon which law enforcement and policy formulation can be used to protect public health and reduce the risks to patient safety by falsified products. For instance, a flourishing e-commerce market allows for Blur Counterfeiting of medicines and infiltration of the legitimate. supply chain by falsified products which reach directly to consumers with limited awareness of the risks.

Healthcare professionals widely recognize these problems but are limited in their ability to prevent falsified medicines from being purchased by patients. Developing countries which lack the enforcement of quality pharmaceutical standards and also struggle with chronically poor storage conditions, high temperatures and high humidity, place patients at risk of degraded medicines (e.g., tetracyclines). In developed countries, where underinsured or uninsured patients purchase spurious products as «medicine»—because the price is significantly lower than that of a legitimate product—are at significant risk. Other areas of exposure from which nefarious actors profit from SSSFFCC products includes: technical barriers in drug sampling methods, the use of 'grey zones' in the production and trade of falsified medicines (which allow criminals to go undetected), a lack of reporting by healthcare workers and patients, and a reluctance by industry and governmental agencies to share critical information for fear of damage to sales and/or reputation associated with criminal activities. Altogether, the market environment holds significant difficulty for manufacturers, governments, regulators, consumers and other stakeholders seeking technologies which can ensure package and product integrity.

Packaging typically employ machine readable labels, such as bar codes, data matrix codes and NFC/RFID-tags, to encode information about one or more packaged items, which can be read a suitable interrogator (e.g., bar code reader or NFC/RFID interrogator) as needed.

Cypack AB of Stockholm, Sweden has developed technology that employs printed resistive loops or traces and an electronics module on a package to detect damage to or intrusion into the package. A tamper event that breaks one or more of the resistive loops is detected by the electronics module and stored with a timestamp. Details of this technology is described in U.S. Pat. No. 7,170,409.

SMARTRAC N.V of Amsterdam, Netherlands has developed similar technology (referred to as CIRCUS TAMPER LOOP) that employs printed resistive loops or traces and an NFC/RFID chip (NXP's NTAG 213 TT chip) on a package to detect damage to or intrusion into the package. Details of this technology is described at https://www.smartrac-group.com/circus-tamper-loop-a-new-digital-seal-for-your-products.html.

The resistive-loop tamper detection mechanisms used by these technologies operate at the primary entry point of the package and can easily be thwarted by nefarious actors. For example, a wire or other conductive material can be added that provides a bypass path for a loop or trace that is cut or otherwise broken by the intrusion or damage to the package. Such designs make it relatively easy for nefarious actors to be a few steps ahead of the tamper detection mechanisms. Other packaging technologies include bar coding (1-D and 2-D), holography, nanotechnology, taggants, and "other security options" such as software integration services.

SUMMARY

In embodiments, a packaging system for at least one article includes a multilayer laminate structure having a conductive layer that is configured to define a set of elongate sections. The system also includes an NFC/RFID integrated circuit that is electrically coupled to an antenna. The NFC/RFID integrated circuit has a plurality of input terminals electrically coupled to a plurality of electrical circuits that provide for electrical connection or electrical disconnection between sections in the set of elongate sections in accordance with a predefined codeword. The NFC/RFID integrated circuit is configured to sense voltage signals produced by the plurality of electrical circuits, determine a sensed codeword based on the sensed voltage signals, compare the sense codeword to the predefined codeword, and output a signal based on such comparison.

In embodiments, the plurality of electrical circuits can include at least one trace of conductive material or other conductor that provides for electrical connection between adjacent sections in accordance with a predefined codeword. The conductive material can be provided by the same conductive layer that forms the elongate sections of the set.

In embodiments, the predefined codeword can be associated with the packaging system for the at least one article or the at least one article. The signal output by the NFC/RFID integrated circuit can provide an indication (or other relation) to suspected counterfeiting or falsification of the at least one article.

In embodiments, the NFC/RFID integrated circuit can include memory that stores data representing the predefined codeword in an encrypted or scrambled form, and electronic circuitry (such as a controller) that reads the data representing the predefined codeword in an encrypted or scrambled form from memory and processes such data to reconstruct the predefined codeword for comparison to the sensed codeword.

In embodiments, each one of the plurality of electrical circuits can include a resistor network that is electrically-coupled to a corresponding adjacent section pair. In one particular embodiment, the NFC/RFID integrated circuit can include a positive power supply voltage terminal and a ground power supply terminal. The resistor network can include a first resistor electrically coupled between the positive power supply voltage terminal and one section of the adjacent section pair, a second resistor electrically coupled between the positive power supply voltage terminal and the other section of the adjacent section pair, and a third resistor electrically coupled between the other section of the adjacent section pair and the ground power supply voltage terminal.

In embodiments, the multilayer laminate structure can encapsulate a transformative material which is configured to change impedance between first and second conductive layers of the multilayer laminate structure in response to an intrusion or perforation.

In embodiments, the elongate sections of the multilayer laminate structure can be electrically coupled to corresponding input terminals of the NFC/RFID integrated circuit (or an additional NFC/RFID integrated circuit) which is configured to detect the change in impedance between the first and second conductive layers of the multilayer laminate structure due to an intrusion or perforation and output a signal based thereon.

In embodiments, the multilayer laminate structure can include at least one detection surface that is separate from the elongate sections and defined by one of the first and second conductive layers of the multilayer laminate structure. The at least one detection surface can be electrically coupled to a corresponding input terminal of the NFC/RFID integrated circuit (or an additional NFC/RFID integrated circuit) which is configured to detect the change in impedance between the first and second conductive layers of the multilayer laminate structure due to an intrusion or perforation and output a signal based thereon.

In embodiments, the signal output by the NFC/RFID integrated circuit (or the additional NFC/RFID integrated circuit) can be related to suspected tampering or intrusion of the at least one article.

In embodiments, the set of elongate sections of the multilayer laminate structure that are electrically coupled to the NFC/RFID integrated circuit and the at least one detection surface that is electrically coupled to the NFC/RFID integrated circuit (or the additional NFC/RFID integrated circuit) can be arranged in a stacked configuration.

In embodiments, the set of elongate sections of the multilayer laminate structure that are electrically coupled to the NFC/RFID integrated circuit and a plurality of detection surfaces that are electrically coupled to the NFC/RFID integrated circuit (or the additional NFC/RFID integrated circuit) can be arranged in an interdigitated layout.

In embodiments, the set of elongate sections of the multilayer laminate structure that are electrically coupled to the NFC/RFID integrated circuit and the at least one detection surface that is electrically coupled to the additional NFC/RFID integrated circuit can be arranged in a stacked configuration.

In embodiments, the packaging system can include an additional multilayer laminate structure that encapsulates a transformative material between first and second conductive layers. An additional NFC/RFID integrated circuit is electrically coupled to the antenna or additional antenna. The additional NFC/RFID integrated circuit can also be electrically coupled to the first and second conductive layers of the additional multilayer laminate structure, wherein the transformative material is configured to change impedance between the first and second conductive layers in response to an intrusion or perforation. At least one operational characteristic of the additional NFC/RFID integrated circuit can be dependent on the change in impedance between the first and second conductive layers of the additional multilayer laminate structure due to an intrusion or perforation.

In embodiments, the additional multilayer laminate structure can include at least one detection surface defined by one of the first and second conductive layers of the additional multilayer laminate structure. The additional NFC/RFID integrated circuit can have at least one input terminal that is electrically coupled to the at least one detection surface. The additional NFC/RFID integrated circuit can be configured to detect the change in impedance between the first and second conductive layers of the separate multilayer laminate structure due to an intrusion or perforation in the at least one detection surface and output a signal based thereon. The signal output by the additional NFC/RFID integrated circuit can be an indication of (or otherwise related to) suspected tampering or intrusion of the at least one article.

In embodiments, the set of elongate sections of the multilayer laminate structure that are electrically coupled to the NFC/RFID integrated circuit and the at least one detection surface that is electrically coupled to the additional NFC/RFID integrated circuit are arranged in a stacked configuration.

In embodiments, the NFC/RFID integrated circuit can further include decode circuitry and a register, wherein the decode circuitry is configured to decode the voltage signals supplied by the plurality of electrical circuits to generate the sensed codeword, and the register is configured to store the sensed codeword generated by the decode circuitry.

In embodiments, the multilayer laminate structure (and/or additional multilayer laminate structure) can have a first configuration that provides a relatively high impedance electrical current path between the first and second conductive layers under normal conditions absent intrusion or perforation, and a second configuration that provides a relatively low impedance electrical current path between the first and second conductive layers in response to the intrusion or perforation.

In embodiments, the transformative material can undergo a state change that changes impedance between the first and second conductive layers in response to the intrusion or perforation.

In embodiments, the transformative material can include a reactive material that undergoes a physical change or chemical reaction that irreversibly deposits material that forms to a relatively low impedance electrical current path between the first and second conductive layers in response to the intrusion or perforation.

In embodiments, the multilayer laminate structure can further include an encapsulated reagent that reacts with the transformative material to aid the physical change or chemical reaction that irreversibly deposits material that form the relatively low impedance electrical current path between the first and second conductive layers in response to the intrusion or perforation.

In embodiments, the multilayer laminate structure can include microcapsules of the transformative material or microcapsules of the reagent or both, where such microcapsules release encapsulated material or reagent for mixing in response to the intrusion or perforation.

In embodiments, the transformative material can include metal ions that undergo a galvanic displacement reaction that precipitates solid-phase metal in response to the intrusion, wherein the solid phase metal forms all or part of a low impedance electrical current path between the first and second conductive layers in response to the intrusion or perforation.

In embodiments, the NFC/RFID integrated circuit can be a passive NFC/RFID integrated circuit that cooperates with the antenna to receive and store electrical power from electromagnetic radiation emitted by an external NFC/RFID interrogator.

In embodiments, the packing system can be configured as a sensing barrier or surface that protects at least one article, wherein the first NFC/RFID integrated circuit is configured to detect and register suspected counterfeiting or falsification of the at least one article.

In embodiments, the at least one article is selected from the group
  medicine
  foods or beverages
  chemicals
  forensics samples
  electronics
  electro-mechanical products
  branded products
  lifestyle personal products
  documents or works of art
  plastics or rubbers
  fabrics or leather goods
  wood
  combinations of these products or other products thereof A method of monitoring at least one packaged article is also provided that employs the packaging system together with an NFC/RFID interrogator to configure the NFC/RFID integrated circuit of the packaging system to detect and register suspected counterfeiting or falsification of the at least one article. Such operations can be repeated multiple points in time to detect and register suspected counterfeiting or falsification of the at least one article over time.

A method of monitoring at least one packaged article is also provided that employs the packaging system as the at least one article is exchanged along a supply chain. At one or more points along the supply chain, an NFC/RFID interrogator is used to configure the NFC/RFID integrated circuit of the packaging system to detect and register suspected counterfeiting or falsification of the at least one article along the supply chain and read other information, such as ingredient information (e.g., source and date of extraction), manufacturing information (such as Plant Number and Lot number), quality control information, product identifier(s), warehousing, shipping/distribution information (for an origin to destination with intermediate locations there between), information related to point of sale including online shopping, retail stores, shops, terminals, and other arbitrary points along the supply chain.

DETAILED DESCRIPTION OF THE PREFERRED EMBODIMENTS

Figure 1A:
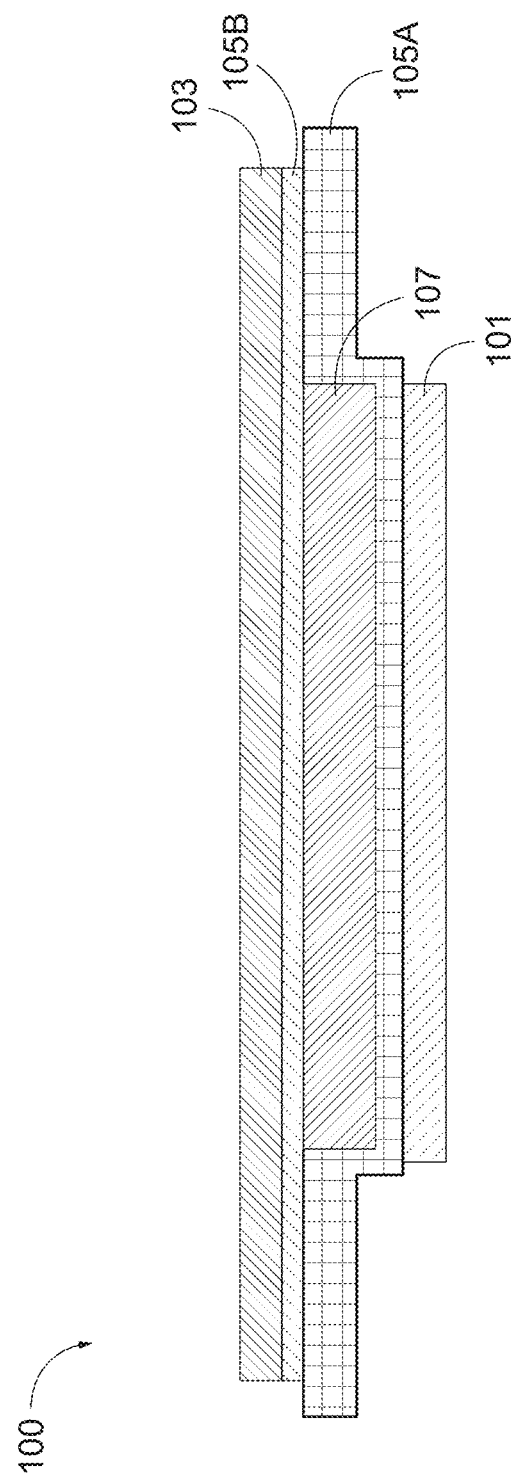
FIG. 1A is a schematic cross-sectional view of an exemplary multilayer laminate structure that can be used in packaging systems according to the present disclosure.

The following definitions apply to the present disclosure.

The term "adulterated product" is a finished product where one or more components of the finished product are fraudulent.

The term "blur counterfeiting" involves counterfeiting of products for which consumers are unsure of the status of the products as being authorized for sale (e.g., genuine) or not authorized for sale (e.g., stolen, imported or sold illegally).

The term "counterfeit product" is a fraudulent product that replicates key aspects of a genuine product. Stolen products are Counterfeit products.

The term "counterfeit drug" is a chemical entity intended for consumption that is deliberately and fraudulently mislabeled with respect to identity and/or source. One special class of substandard drugs is the class of counterfeit drugs.

The term "counterfeit goods" are illegally made products that resemble genuine goods but are typically of lower quality in terms of performance, reliability, or durability. These may also be direct copies of products which bear a trademark that is identical to, or indistinguishable from, a trademark registered to another party and that infringes the rights of the holder of the trademark.

The term "counterfeit medicine" is a chemical entity which is deliberately and fraudulently mislabeled with respect to identity and/or source and may include products with the correct ingredients but fake packaging, with the wrong ingredients, without active ingredients or with insufficient active ingredients.

The term "counterfeited materials" are unauthorized materials whose special characteristics are protected as intellectual property rights, patents and copyrights.

The term "diversion" means the sale or distribution of legitimate products outside of intended markets.

The term "falsified products" are deliberately/fraudulently sold products which misrepresent their identity, composition or source, including those which are substandard and obsolete and misrepresented as functional.

The term "relatively high impedance electrical current path" and "relatively low impedance electrical current path" are relative terms, where the "relatively high impedance electrical current path" has an impedance that is significantly larger than the "relatively low impedance electrical current path"; in embodiments, the "relatively high impedance electrical current path" can have an impedance that is at least 1,000 times that of the "relatively low impedance electrical current path"; in other embodiments, the "relatively high impedance electrical current path" can have an impedance that at least 10,000 times that of the "relatively low impedance electrical current path"; and in still other embodiments, the "relatively high impedance electrical current path" can have an impedance that at least 100,000 times that of the "relatively low impedance electrical current path."

The term "imitation products" are indirect copies (i.e., imitation smartphones) that recreate an overall similarity, even if the details of the packaging differ between a well-established brand and the imitator's own-label product.

The term "intrusion" means a physical break (e.g., puncture) of the multilayer laminate structure which leads to a detectable change in the electrical impedance between opposed layers of the multilayer laminate.

The term "over-run product" means a legitimate product which has been made in excess of production agreements.

The term "product counterfeiting" means unauthorized representation of a registered trademark carried on goods identical or similar to goods for which the trademark is registered, with a view to deceiving the purchaser into believing that he/she is buying the original goods.

The term "sensing" means the function or operation of the multilayer laminate structure to detect an intrusion.

The term "siphoned product" means any product which has had a part (e.g., volume) removed and is represented as being whole.

The term "spurious product" means any product which purports in name, identity, color, pattern, design or content to be real and is fake.

The term "SSSFFCC Product" means any one of siphoned, substandard, spurious, falsely-labeled, falsified, or counterfeit products.

The term "substandard product" (aka "out-of-specification product") means authorized products that fail to meet either their quality standards or specifications, or both.

The term "substandard drugs" are genuine medicines and medical devices that have not passed the quality testing protocols previously set for each product (e.g., have incorrect quantity of active ingredient, which could be secondary to excessive decomposition of active ingredient as a result of high temperature and humidity, and poor-quality assurance during the manufacture of pharmaceutical products in less-developed countries).

The term "tampered product" is a legitimate product and associated packaging which is being used in a fraudulent way.

The term "stolen product" is a legitimate product stolen and passed-off as legitimately procured.

The term "unregistered or unlicensed medical products" are medical products that have not undergone evaluation and/or approval by a national or regional regulatory authority for the market in which they are marketed/distributed or used, subject to permitted conditions under national or regional regulation and legislation.

The term "relatively high impedance electrical current path" and "relatively low impedance electrical current path" are relative terms, where the "relatively high impedance electrical current path" has an impedance that is significantly larger than the "relatively low impedance electrical current path"; in embodiments, the "relatively high impedance electrical current path" can have an impedance that is at least 1,000 times that of the "relatively low impedance electrical current path"; in other embodiments, the "relatively high impedance electrical current path" can have an impedance that at least 10,000 times that of the "relatively low impedance electrical current path"; and in still other embodiments, the "relatively high impedance electrical current path" can have an impedance that at least 100,000 times that of the "relatively low impedance electrical current path."

The present disclosure includes a packaging system for at least article or item, which includes a multilayer laminate structure that includes an encapsulated transformative material that is disposed between first and second conductive layers. The transformative material is configured to undergo a state change (for example, by a chemical reaction or physical change) that changes impedance between the first and second conductive layers in response to an intrusion or perforation through at least part of the multilayer laminate structure. One of the first and second conductive layers is patterned to form a set of distinct sections or fingers. An NFC/RFID integrated circuit is provided that is coupled to a coil antenna. The NFC/RFID integrated circuit includes a plurality of input terminals that are electrically coupled to electrical circuits that provide for electrical connection or electrical disconnection between fingers in accordance with a predefined codeword. The electrical connection between fingers can be provided by metal traces or wires or other suitable conducting means, while electrical disconnection between fingers can be provided by insulating material, insulating void space or other suitable insulating means. The configuration of the electrical circuits that provide for electrical connection or electrical disconnection between fingers is dictated by the known design and manufacture of the packaging system. The particular design will produce voltage signals at the input terminals of the NFC/RFID integrated circuit that decode to the predefined codeword. This predefined codeword is associated with genuine packaged goods and is used to distinguish the genuine packaged goods from counterfeit or falsified goods.

More specifically, an attempt to copy the packaging design for counterfeit or falsified goods will require that the copy replicate the electrical circuits that provide for electrical connection or electrical disconnection between adjacent fingers and the interconnection of the electrical circuits to the input terminals of the NFC/RFID integrated circuit. Such replication can be made very difficult to accomplish (for example, by obfuscating or hiding the interconnection between adjacent fingers and by laying out and interconnecting the fingers in a complex or random pattern), and failure to do so will produce voltage signals at the input terminals of the NFC/RFID integrated circuit that do not decode to the predefined codeword. In response to one or more commands communicated from an external NFC/RFID interrogator, the NFC/RFID integrated circuit can be configured to detect and register a match or mismatch between the predefined codeword and the codeword detected by sensing and decoding the voltage signals received at the input terminals of an NFC/RFID integrated circuit, and output a signal indictor based thereon for communication to the NFC/RFID interrogator. For example, the signal indicator can indicate the absence of suspected counterfeit or falsified goods in the event that the voltage signals produced at the input terminals of the NFC/RFID integrated circuit do decode to the predefined codeword. In another example, the signal indicator can indicate the presence of suspected counterfeit or falsified goods in the event that the voltage signals produced at the input terminals of the NFC/RFID integrated circuit do not decode to the predefined codeword.

In embodiments, the NFC/RFID integrated circuit can include memory and a controller. The memory can be configured to store code data (e.g., in an encrypted or scrambled form) that can be read by the controller and processed (for example, by decrypting or descrambling the code data) to reproduce the predefined codeword. In response to command(s) issued by the external NFC/RFID interrogator, the controller can read the code data stored in the memory and reproduce the predefined codeword. In conjunction with such processing, the NFC/RFID integrated circuit can sense and decode the voltage signals produced at the input terminals of the NFC/RFID integrated circuit to generate a sensed codeword. The controller can compare the sensed codeword to the predefined codeword and output a signal indictor based on the results of the comparison for communication to the external NFC/RFID interrogator. For example, if the sensed codeword matches the predefined codeword, the controller can output a "fingerprint pass" signal for communication to the NFC/RFID interrogator where the "fingerprint pass" signal indicates the absence of suspected counterfeit or falsified goods. In another example, if the sensed codeword does not match the predefined codeword, the controller can output a "fingerprint fail" signal that indicates the presence of suspected counterfeit or falsified goods. In this manner, the operational characteristic of the NFC/RFID integrated circuit can be ascertained and analyzed (for example, by suitable operations of an external NFC/RFID interrogator) to detect and register suspected counterfeit or falsified goods of the packaging. Note that the functionality of the controller can also be carried out by suitable signal processing and logic circuits.

The packaging system can also include an additional NFC/RFID integrated circuit, which is also coupled to the same coil antenna (shared with the other NFC/RFID integrated circuit) or coupled to its own coil antenna. The set of fingers are also electrically coupled to corresponding input terminals of the additional NFC/RFID integrated circuit. In response to one or more commands communicated by an external NFC/RFID interrogator, the additional NFC/RFID integrated circuit can be configured to sense the voltage signals received at its input terminals. Absent any intrusion or perforation, the multilayer laminate structure provides a relatively high impedance electrical current path between the first and second conductive layers of the multilayer laminate structure, and the fingers of the multilayer laminate structure produce voltage signals at the input terminals of the additional NFC/RFID integrated circuit that represent this relatively high impedance electrical current path. However, an intrusion or perforation causes the transformative material of the multilayer laminate structure to undergo a state change that changes impedance between the first and second conductive layers. This impedance change results in relatively low impedance electrical current path between the first and second conductive layers of the multilayer laminate structure, and one or more fingers of the multilayer laminate structure in the vicinity of the intrusion can produce voltage signals at the input terminals of the additional NFC/RFID integrated circuit that represent this relatively low impedance electrical current path. The additional NFC/RFID integrated circuit can be configured to sense the voltage signals at its input terminals, discriminate between the relatively high impedance electrical current path between the first and second conductive layers (absent any intrusion or perforation) and the relatively low impedance electrical current path between the first and second conductive layers (caused by an intrusion or perforation) by comparing the voltage signals to threshold levels or other signal processing, register data that represents the relatively high impedance electrical current path (or relatively low electrical current path) for each one of the fingers based on such discrimination, and output a signal indictor based on such data for communication to the NFC/RFID interrogator. For example, the signal indicator can indicate the presence of suspected tampering of the packing system by an intrusion or perforation in the event that one or more voltage signals produced at the input terminals of the additional NFC/RFID integrated circuit correspond to a relatively low impedance electrical current path between the first and second conductive layers caused by an intrusion or perforation. In another example, the signal indicator can indicate the absence of suspected tampering of the packing system by an intrusion or perforation in the event that one or more voltage signals produced at the input terminals of the additional NFC/RFID integrated circuit correspond to a relatively high impedance electrical current path between the first and second conductive layers.

In embodiments, the additional NFC/RFID integrated circuit can include a controller. In response to command(s) issued by the external NFC/RFID interrogator, the additional NFC/RFID integrated circuit can sense the voltage signals produced at its input terminals, discriminate between the relatively high impedance electrical current path between the first and second conductive layers (absent any intrusion or perforation) and the relatively low electrical current path between the first and second conductive layers (caused by an intrusion or perforation) by comparing the voltage signals to threshold levels or other signal processing, and register data that represents the relatively high impedance electrical current path (or relatively low electrical current path) for each one of the fingers based on such discrimination. The controller of the additional NFC/RFID integrated circuit can process the registered data in order to detect that an intrusion or perforation has occurred, and output a signal indictor based thereon for communication to the NFC/RFID interrogator. For example, if the detected voltage signals and resulting data values correspond to the relatively high impedance electrical current path between the first and second conductive layers (absent any intrusion or perforation), the controller can output an "intrusion detection pass" signal for communication to the NFC/RFID interrogator where the "intrusion detection pass" signal indicates the absence of suspected tampering by intrusion or perforation of the packing system. In another example, if any one of the detected voltage signals and resulting data values correspond to the relatively low impedance electrical current path between the first and second conductive layers (caused by an intrusion or perforation), the controller can output an "intrusion detection fail" signal for communication to the NFC/RFID interrogator where the "intrusion detection fail" signal indicates the presence of suspected tampering by intrusion or perforation of the packing system. In this manner, the operational characteristic of the additional NFC/RFID integrated circuit can be ascertained and analyzed (for example, by suitable operations of an external NFC/RFID interrogator) to detect and register the suspected tampering of the packaging that results in an intrusion or perforation through at least part of the multilayer laminate structure. Note that the functions of the controller of the additional NFC/RFID integrated circuit can also be carried out by suitable signal processing and logic circuits.

Figure 1B:
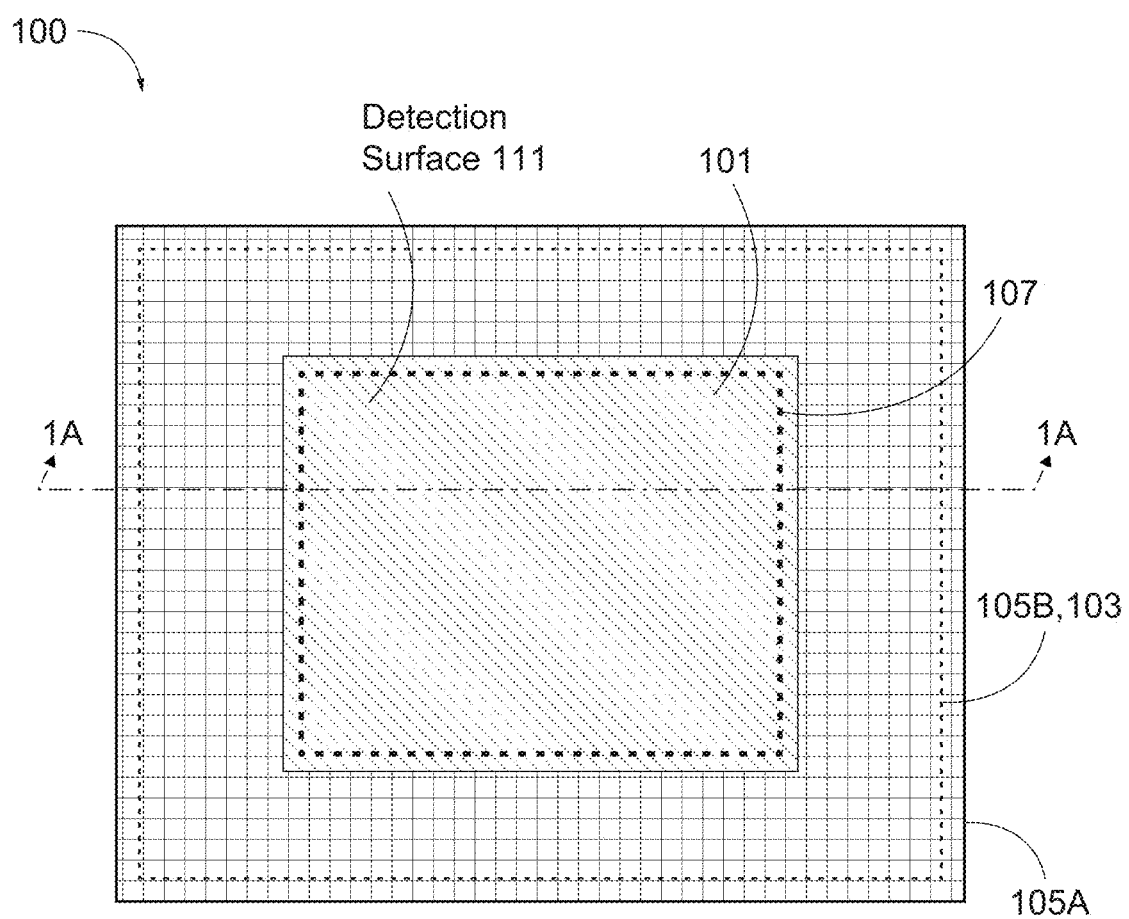
FIG. 1B is a schematic bottom view of the multilayer laminate structure of FIG. 1A.
Figure 1C:
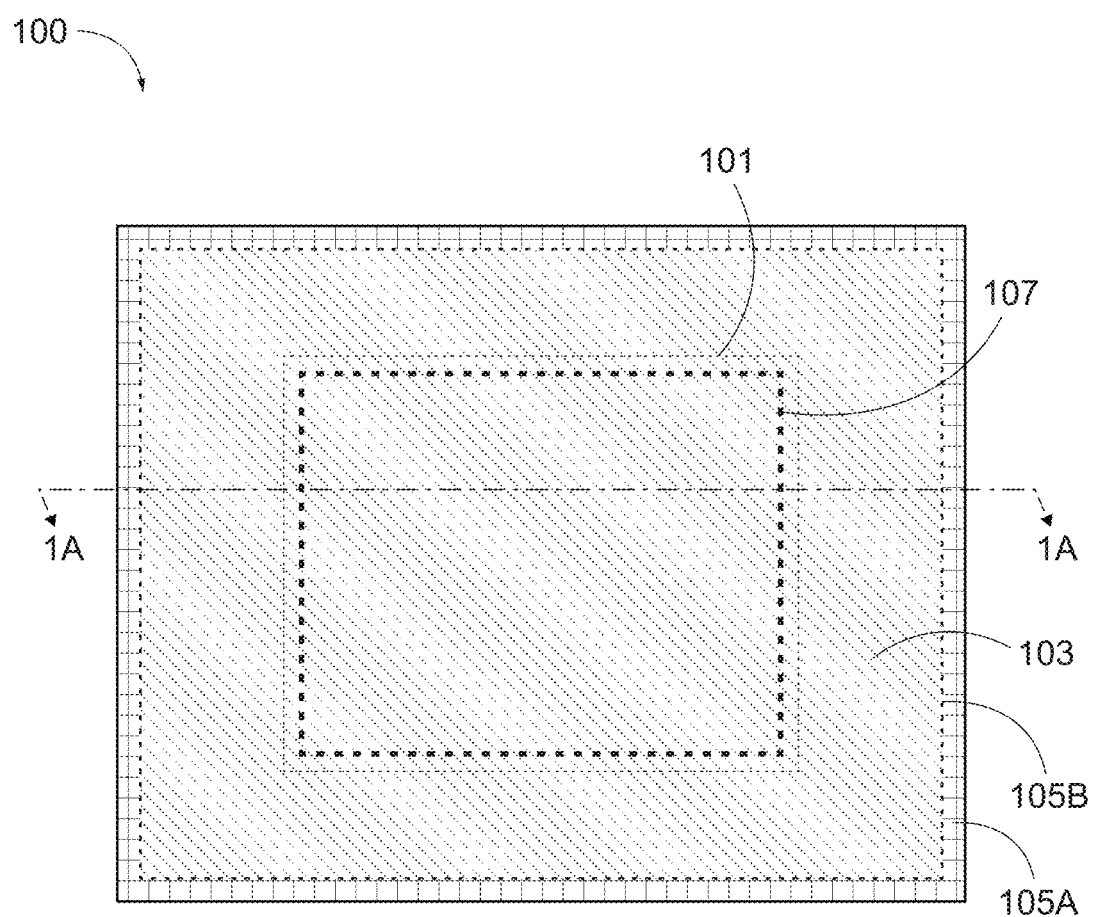
FIG. 1C is a schematic top view of the multilayer laminate structure of FIG. 1A.

FIGS. 1A, 1B and 1C show an example flexible multilayer laminate structure 100 that can be used to form the packaging system, which includes a first conductive layer 101, a second conductive layer 103, and intermediate layers 105A and 105B that encapsulate transformative material 107 disposed between the first and second conductive layers 101, 103. The layers may be thin flexible sheets such that the multilayer laminate structure 100 is flexible in nature and thus is able to bend or fold. In embodiments, the multilayer laminate structure 100 can be formed by suitable printing technologies, such as continuous gravure or rolled based printing, roll-to-roll printing, stamp printing or inkjet printing. Various microprinting technologies can also be used if desired.

The transformative material 107 may include, for instance, a metal ion solution such as silver nitrate gel solution with silver ions that precipitate as solid-phase silver by a galvanic displacement reaction with certain noble metals. The first and second conductive layers 101 and 103 can be formed from a conductive material (e.g., a noble metal such as copper, magnesium, zinc, or tin) that undergoes a galvanic displacement reaction with a transformative material, such as for instance, silver ions of a silver nitrate gel solution 107 to precipitate solid-phase silver from the silver nitrate gel solution. Other metal ion solutions can be paired with other noble metals that support the galvanic displacement reaction with the metal ion solution and precipitates solid-phase metal from the solution. The intermediate layer 105A can be formed from a thin film of a conductive material (such as a conductive polymer). The intermediate layer 105B can be formed from a thin film of electrically-insulating material such as polyethylene terephthalate (PETG), photo-resistant polymer, Mylar, a spun polymer with a metallic oxide coating, or other encapsulating or insulating material. Alternately, the intermediate layer 105B can be formed from a hard electrically-insulating material, such as a hard polymer film of Kapton and/or Mylar and/or BoPET or another hard polymer than can be spin-coated or dip coated. The hardness of the polymer film can be in the range of shore 40D to shore 80D or higher. The thickness of the polymer film can range from 5 microns to 20 microns. Alternately, the intermediate layer 105B can be formed from a hard thin-film electrically-insulating ceramic material, such as silicon oxide, aluminum oxide, silicon nitrate, titanium nitrate, titanium oxide, zirconium tetrafluoride and combinations thereof. The hardness of the thin-film ceramic material can be in the range of shore 40D to shore 80D or higher. The thickness of the thin-film ceramic material can range from 0.1 microns to 1 micron. Alternatively, the intermediate layer 105B can be formed from a thin film of conductive material (such as the same or different conductive polymer as that of 105A). The intermediate layers 105A and 105B encapsulate the transformative material (silver nitrate gel solution) 107 between the first and second conductive layers 101, 103 as shown. The intermediate layer 105A can extend laterally beyond the intermediate layer 105B and the second conductive layer 103 as shown. The first conductive layer 101 can cover the transformative material 107 as shown and is typically positioned facing the package product and closest to the packaged product, while the second conductive layer 103 is typically positioned facing away from the package product and furthest from the packaged product.

Note that in this configuration the conductive material of the intermediate layer 105A can be selected such that it does not undergo a galvanic displacement reaction with the silver metal ion solution (e.g., the silver nitrate gel solution that precipitates solid-phase silver). In this configuration, the metal(s) of the first conductive layer 101 would undergo a galvanic displacement reaction with metal ions of the metal ion solution if in contact with the metal ion solution, but it is inhibited from doing so by the intervening intermediate layer 105A. Furthermore, the material of the intermediate layer 105B can be selected such that it does not undergo a galvanic displacement reaction with the metal ion solution that precipitates the solid-phase metal. In this configuration, the metal(s) of the second conductive layer 103 would undergo an irreversible galvanic displacement reaction with metal ions of the metal ion solution if in contact with the metal ion solution, but it is inhibited from doing so by the intervening intermediate layer 105B.

Figure 2A:
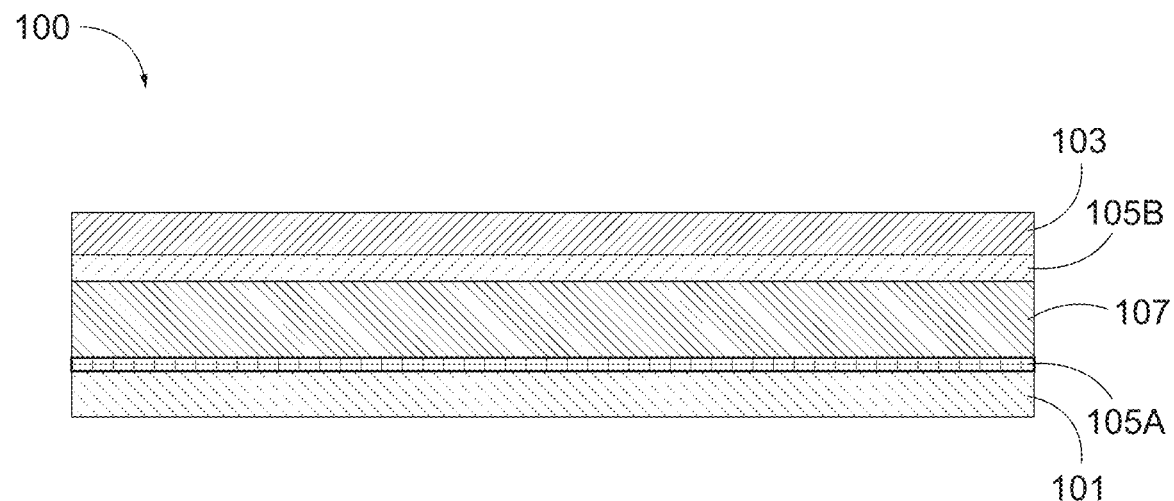
FIGS. 2A-2D are schematic views of an exemplary intrusion or perforation through the multilayer laminate structures of FIGS. 1A-C and the galvanic displacement reaction and resulting structural and electrical changes to the multilayer laminate structure that result from such intrusion.

Note that under normal conditions absent an intrusion or perforation, the multilayer laminate structure 100 has a configuration that provides a relatively high impedance electrical current path between the first and second conductive layers 101 and 103 as shown in FIG. 2A. However, in response to an intrusion or perforation, the multilayer laminate structure 100 automatically reconfigures itself to a different configuration where metal ions of the metal ion solution (e.g., silver ions of a silver nitrate gel solution) precipitate to form solid-phase metal (e.g., silver) that provides part or all of a relatively low impedance electrical current path between the first and second conductive layers 101 and 103 as shown in FIGS. 2B to 2D.

Figure 2B:
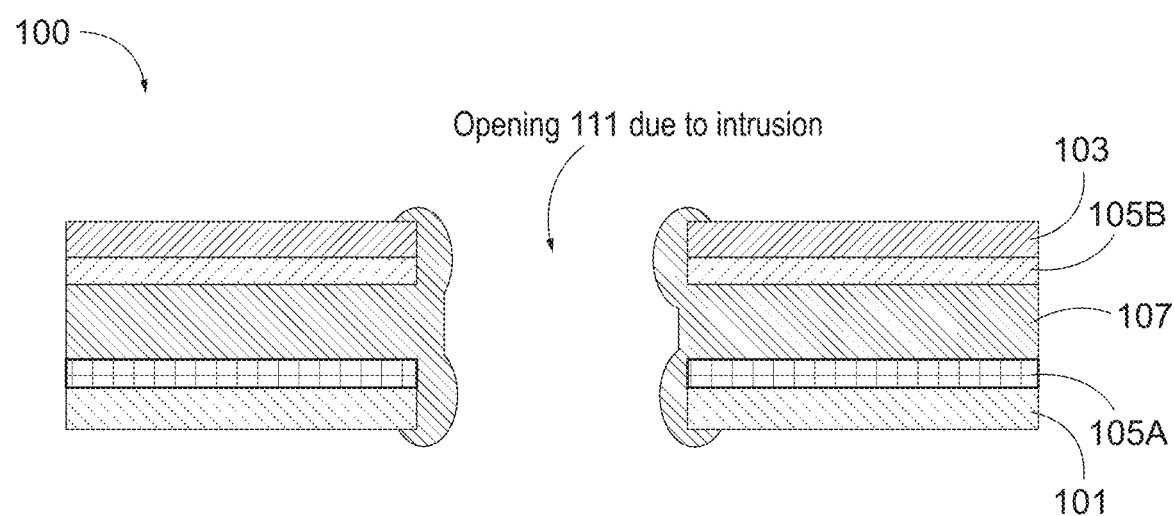
Figure 2C:
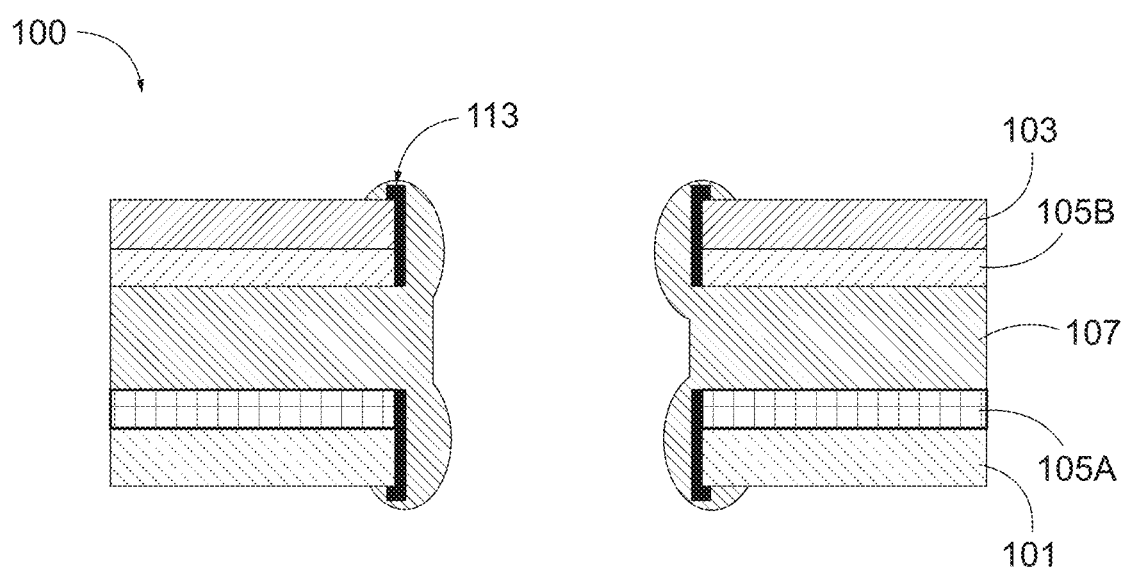

More specifically, an intrusion or perforation can form an opening 111 that extends completely through the first and second conductive layers 101, 103 of the multilayer laminate structure as shown in FIG. 2B. In response to such intrusion or perforation, the metal ion solution (e.g., silver nitrate gel solution) can be displaced (or flow) through this opening 111 and contact both the first and second conductive layers 101, 103 as shown. The metal ion solution (e.g., silver nitrate gel solution) by itself is conductive. Thus, if sufficient metal ion solution is present in the space between the first and second conductive layers 101 and 103, the initial displacement (flow) of the metal ion solution (e.g., silver nitrate gel solution) can form all or part of a low impedance current path between the first and second conductive layers 101 and 103.

Furthermore, with the metal ion solution (e.g., silver nitrate gel solution) in contact with the appropriate metal(s) of the first and second conductive layers 101 and 103, the metal ion solution (e.g., silver nitrate gel solution) can undergo a galvanic displacement reaction that precipitates solid-phase metal (e.g., silver) in response to the intrusion. The solid-phase metal (e.g., silver) precipitate 113 can extend from the second conductive layer 103 through the adjacent intermediate layer 105B as shown in FIG. 2C. The metal ion solution 107 by itself is conductive. Thus, if sufficient metal ion solution 107 (e.g., silver nitrate gel solution) is present in the space between the deposited solid-phase metal (e.g., silver) and the intermediate layer 105A or the first conductive layer 101, the solid-phase metal precipitate (e.g., silver) in conjunction with the metal ion solution (e.g., silver nitrate gel solution) can form all or part of a relatively low impedance electrical current path between the first and second conductive layers 101 and 103.

Figure 2D:
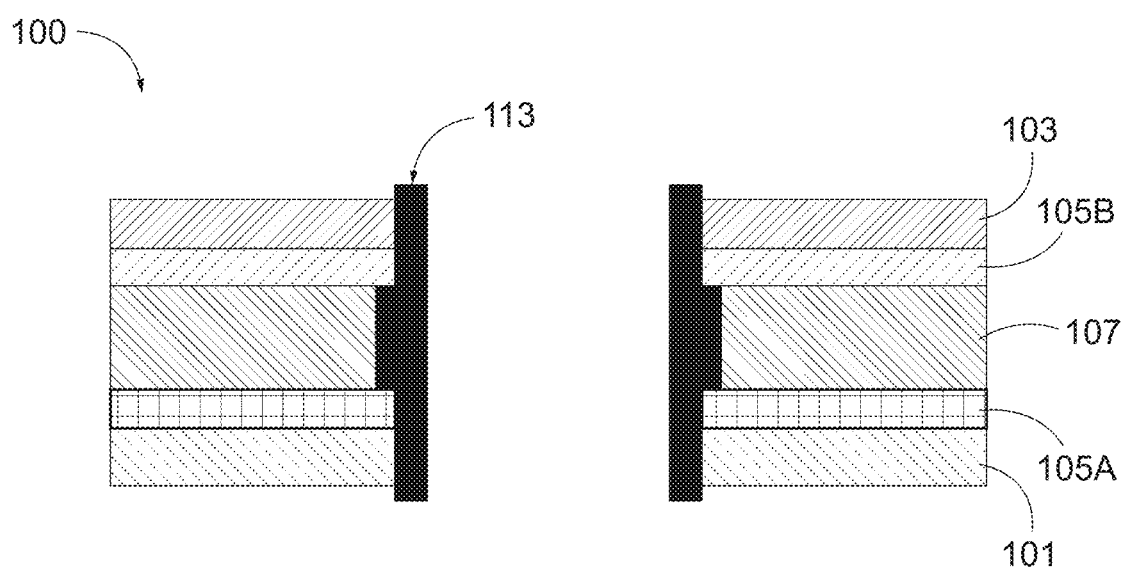

Moreover, the precipitation of the solid-phase metal (e.g., silver) can continue such that the solid-phase metal precipitate extends between first and second conductive layers 101 and 103 as shown in FIG. 2D. In this manner, the solid-phase metal precipitate alone (e.g., silver) 113, without any conductive metal ion solution (e.g., silver nitrate gel solution), can form all or part of a relatively low impedance electrical current path between the first and second conductive layers 101 and 103.

In this manner, the multilayer laminate structure 100 can function under normal conditions as a flexible two-plate capacitor with the first and second conductive layers equivalent to the two plates of the capacitor, and the encapsulated metal ion solution 107 equivalent to the dielectric medium between the two plates. As a two-plate capacitor, the multilayer laminate structure 100 provides a relatively high impedance electrical current path between the first and second conductive layers 101 and 103. In response to the intrusion or perforation, the metal ion solution can flow or undergo a galvanic reaction that provides part or all of a relatively low impedance electrical current path between the first and second conductive layers 101 and 103.

Figure 3:
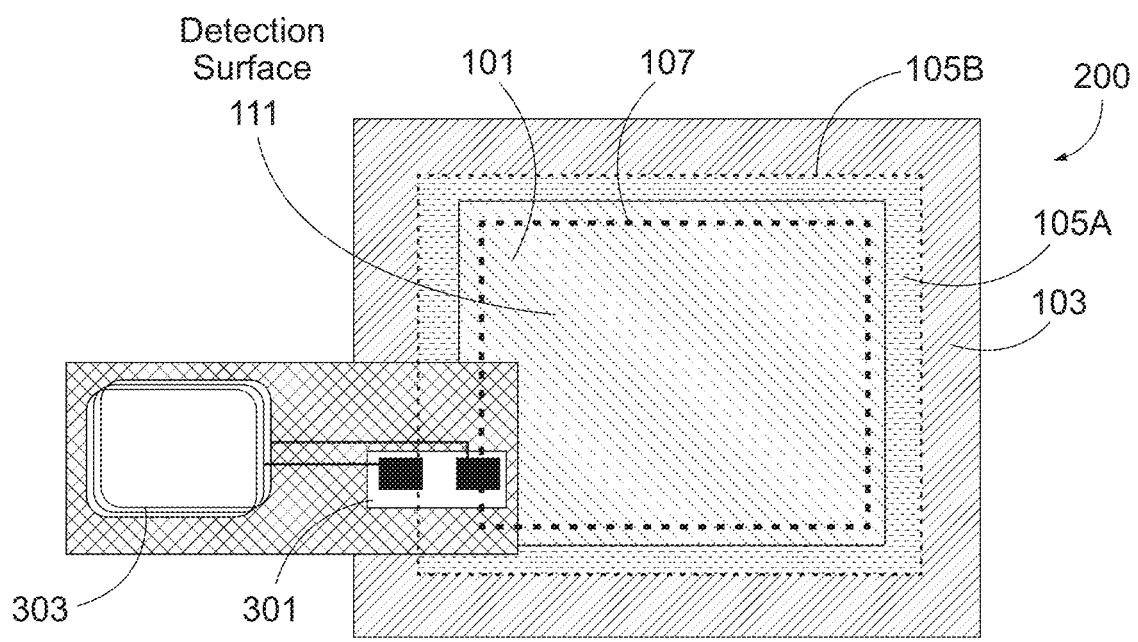
FIG. 3 is a schematic top view of an example packaging system that employs the multilayer laminate structure of FIGS. 1A-1C together with an NFC/RFID integrated circuit and coil antenna.

FIG. 3 is a schematic diagram that illustrates an exemplary embodiment where the multilayer laminate structure of FIGS. 1A to 1C is folded about four opposite edges such that second conductive layer 103 surrounds the perimeter of resulting structure 200 with a portion that faces the same direction as the first conductive layer 101. The exposed portion of the first conductive layer 101 provides a detection surface 111 as shown. In this configuration, a sub-assembly or tag 300 that includes an NFC/RFID integrated circuit 301 and two-terminal coil antenna 303 (e.g., a copper trace antenna) can be mounted or otherwise supported on the structure 200, particularly on the first conductive layer 101 and the portion of second conductive layer 103 that faces the same direction as the first conductive layer 101 as shown. The NFC/RFID integrated circuit 301 and the two-terminal coil antenna 303 (e.g., a copper trace antenna) can be mounted or otherwise supported on the structure 200 by suitable interconnect structures (such as ball-type interconnects). In embodiments, the tag 300 can include a flexible substrate with the coil antenna 303 printed or otherwise supported on the flexible substrate. The NFC/RFID integrated circuit 301 can also be supported by the flexible substrate. Although any number of materials may be used for the flexible substrate, the flexible substrate may be a flexible polyethylene terephthalate (PETG) film.

The NFC/RFID integrated circuit 301 includes two coil input terminals that are electrically connected to the two terminals of the coil antenna 303. The NFC/RFID integrated circuit 301 can cooperate with the coil antenna 303 to exchange data with an external NFC/RFID interrogator using radio frequency (RF) signals as is well known. The NFC/RFID integrated circuit 301 is a passive-type NFC/RFID device which does not contain a battery, but instead includes power management circuitry that harvests and stores electrical power from the radio signals that are transmitted by the NFC/RFID interrogator and received by the coil antenna 303. Such electrical power can be regulated to one or more predefined voltage levels and supplied to the circuit elements of the NFC/RFID integrated circuit 301 for activation of the circuit elements. The circuit elements typically include modulator/demodulator circuitry that demodulates the radio signals that are transmitted by the NFC/RFID interrogator and received by the antenna circuitry and that modulates radio signals that are transmitted by the antenna to the NFC/RFID interrogator, and a controller and non-volatile memory for processing and storing data.

In the embodiment of FIG. 3, under normal conditions absent an intrusion or perforation, the folded multilayer laminate structure 200 provides a relatively high impedance electrical current path between the first and second conductive layers 101 and 103 and between the two antenna terminals electrically coupled thereto. The relatively high impedance current path between the two antenna terminals allows the NFC/RFID integrated circuit 301 to harvest power from the electromagnetic radiation provided by an external NFC/RFID interrogator and use such harvested power as supply to the electrical components of the NFC/RFID integrated circuit 301 for its operations. In response to an intrusion or perforation, the transformative material 107 of the folded multilayer laminate structure 200 can adapt to provide all or part of a relatively low impedance electrical current path between the first and second conductive layers 101 and 103 and between the two antenna terminals electrically coupled thereto. Such relatively low impedance electrical current path automatically configures the NFC/RFID integrated circuit 301 to remain in a power-off state in the presence of electromagnetic radiation that is normally sufficient to provide electrical power to the NFC/RFID integrated circuit 301. In this manner, if the NFC/RFID integrated circuit 301 remains in a power-off state in the presence of electromagnetic radiation provided by an external NFC/RFID interrogator that is normally sufficient to provide electrical power to the NFC/RFID integrated circuit 301, the external NFC/RFID interrogator 301 can sense this power-off state, interpret this power-off state as a signal of the intrusion, and output an indication (e.g., visual or audible notification) of the intrusion or perforation if and when detected.

For example, in one case for purposes of illustration, the relatively high impedance electrical current path can be on the order of 10 megaohms and the relatively low impedance current path can be on the order of 100 ohms to 1 ohms such that the relatively high impedance electrical current path is on order of 105 to 106 times larger than the relatively low impedance electrical current path. Other configurations can be implemented where the relatively high impedance electrical current path is less than or more than these values and where the relatively low impedance current path is less than or more than these values.

Figure 4A:
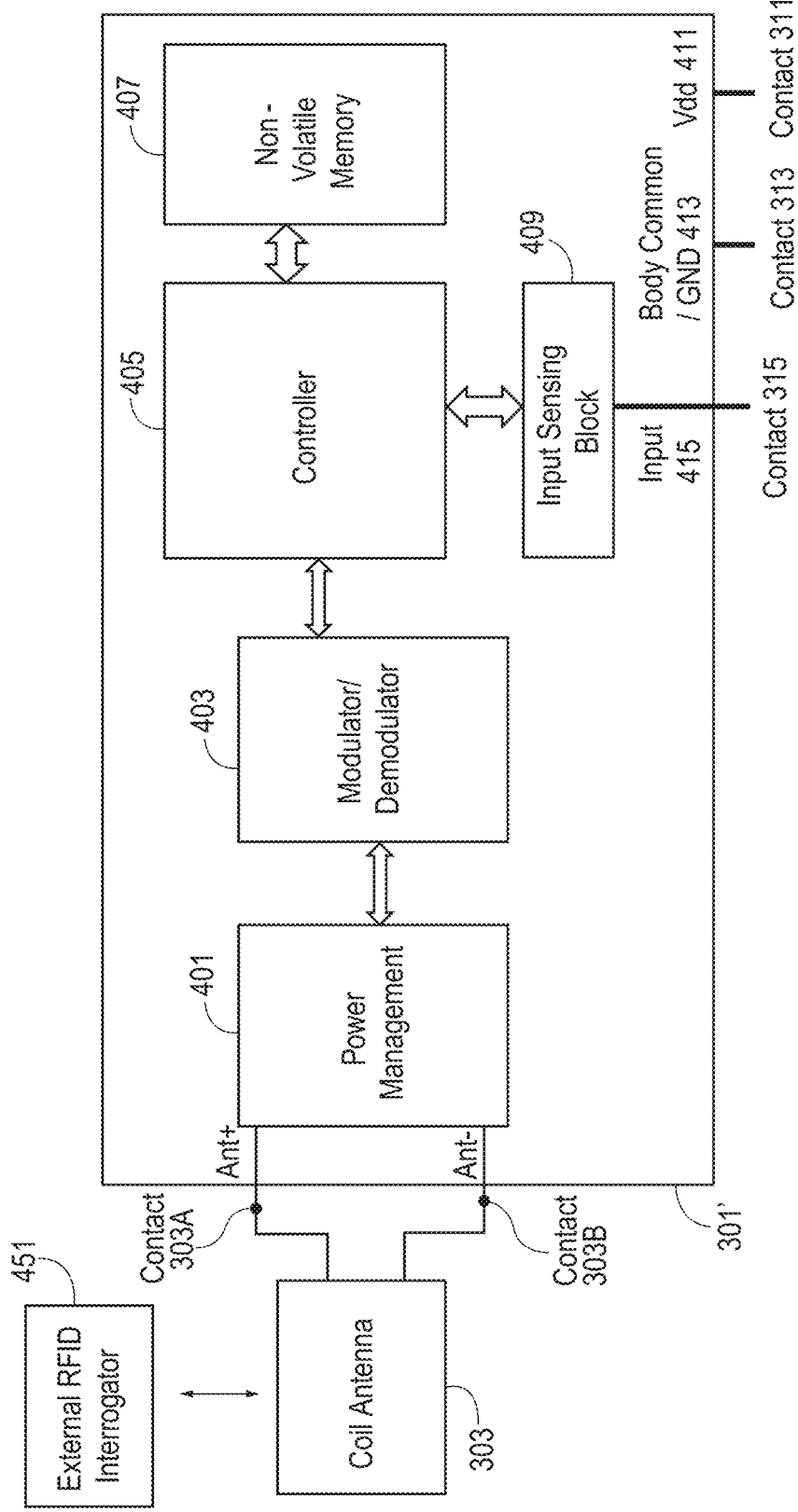
FIG. 4A is a functional block diagram of an NFC/RFID integrated circuit and coil antenna with electrical interconnection between. terminals of the NFC/RFID integrated circuit and the multilayer laminate structure of FIG. 3.
Figure 4B:
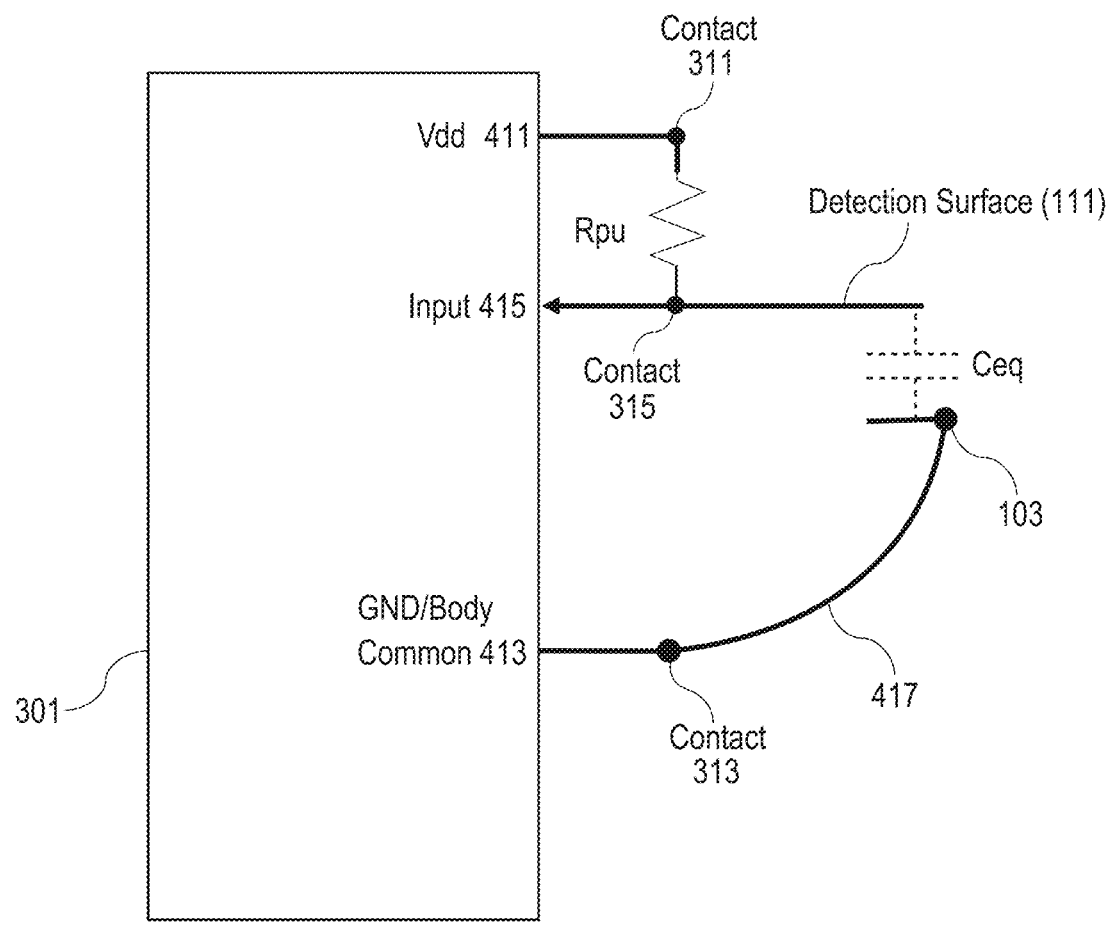
FIG. 4B is a functional block diagram showing electrical interconnection between certain terminals of the NFC/RFID integrated circuit and the multilayer laminate structure of FIG. 3.

In an embodiment shown in FIG. 4A, a passive-type NFC/RFID integrated circuit 301' is provided that includes two coil input terminals (Ant+, Ant−), a $V_{dd}$ terminal 411, a GND or Body Common terminal 413, and an input terminal 415. Similar to the embodiment of FIG. 3, the two coil input terminals (Ant+, Ant−) of the NFC/RFID integrated circuit 301' are electrically interconnected to two antenna contacts 303A, 303B of the coil antenna 303 by a suitable interconnect structure (such as ball-type interconnect). The other terminals of the NFC/RFID integrated circuit 301' are connected to different parts of the multilayer laminate structure and other circuit components as follows. First, the input terminal 415 is electrically interconnected to a contact 315 formed by a patterned conductive layer 101 by a suitable interconnect structure (such as ball-type structure), which provides electrical connection between the input terminal 415 and the detection surface 111 formed by the patterned conductive layer 101. Second, the $V_{dd}$ terminal 411 is electrically interconnected to a contact 311 formed by the patterned conductive layer 101 by a suitable interconnect structure (such as ball-type structure). A pull-up resistor $R_{pu}$ is electrically connected between contact 311 and contact 313 formed by the patterned conductive layer 101 such that the pull-up resistor $R_{pu}$ is electrically connected between the Vdd terminal 411 and the input terminal 415 as shown in FIG. 4B. The pull-up resistor $R_{pu}$ can be interconnected to the contacts 311, 313 or terminals 411, 415 by conductive traces (e.g., layer 101) or by soldered insulating wires or other suitable means. Finally, the GND or Body Common terminal 413 is electrically interconnected to a contact 313 formed by the patterned conductive layer 101 by a suitable interconnect structure (such as ball-type structure). A connector 417, which can be a soldered insulating wire or other suitable means, provides electrical connection between the contact 311 and the second conductive layer 103, and thus provides electrical connection between the GND or Body Common terminal 413 and the second conductive layer 103.

The NFC/RFID integrated circuit 301' can cooperate with the coil antenna 303 to exchange data with an external NFC/RFID interrogator 451 using radio frequency (RF) signals as is well known. The NFC/RFID integrated circuit 301' is a passive-type NFC/RFID device which does not contain a battery, but instead includes power management circuitry 401 that harvests and stores electrical power from the radio signals that are transmitted by the NFC/RFID interrogator and received by the coil antenna 303. Such electrical power can be regulated to one or more predefined voltage levels and supplied to the circuit elements of the NFC/RFID integrated circuit 301' for activation of the circuit elements. The circuit elements can include modulator/demodulator circuitry 403 that demodulates the radio signals that are transmitted by the NFC/RFID interrogator 451 and received by the coil antenna 303 and that modulates radio signals that are transmitted by the coil antenna 303 to the NFC/RFID interrogator 451, a controller 405 and non-volatile memory 407 for processing and storing data, and an input sensing block 409 that is configured to receive an electrical signal supplied by the input terminal 411 for processing and storage as data by the controller 405. The Vdd terminal 411 outputs a positive voltage supply signal that is generated from the electrical energy harvested and stored by the power management circuitry 401. The GND or Common Body terminal 413 provides an external ground or common body reference potential signal.

In embodiments, the NFC/RFID integrated circuit 301' can be an integrated circuit package that is fabricated using semiconductor manufacturing processes. For example, the NFC/RFID integrated circuit 301' can be realized by commercially—available NFC/RFID integrated circuits, such as the UCODE G2iM+ NFC IC sold commercially by NXP Semiconductors N.V or the SIC4310 NFC IC sold commercially by Silicon Craft Technology. Other suitable NFC/RFID integrated circuits can also be used. The RF signals communicated between the NFC/RFID integrated circuit 301' and the NFC/RFID interrogator 451 can conform to one or more standards. For example, ISO/IEC 14443, ISO/IEC 15693, ISO/IEC 118000 and EPC Global UHF Class 1 Generation 2 are common standards supported by NFC/RFID integrated circuits and NFC/RFID interrogators.

In the embodiment shown in FIG. 4B, the detection surface 111 is electrically coupled to a corresponding input terminal 415 of the NFC/RFID integrated circuit 301'. Under normal conditions absent an intrusion or perforation in the detection surface 111, the multilayer laminate structure provides an effective capacitance $C_{eq}$ (a relatively high impedance electrical current path) between the detection surface 111 and the second conductive surface 103. When an intrusion or perforation occurs in the detection surface 111, the transformative material 107 of the multilayer laminate structure can adapt to provide all or part of a relatively low impedance electrical current path between the detection surface 111 and the other conductive layer 103. Specifically, the capacitance $C_{eq}$ is transformed to a low-resistance $R_{eq}$. Thus, the voltage signal at the input terminal 415 becomes $V_{dd}*R_{eq}/(R_{pu}+R_{eq})$, where $R_{pu}$ is the resistance of the pull-up resistor $R_{pu}$. By choosing the appropriate Rpu, the voltage signal at the input terminal 415 sensed for an intrusion or perforation will be less than a predefined threshold voltage, which allows for discrimination between the relatively high impedance electrical current path between the detection surface 111 and the second conductive surface 103 (absent an intrusion or perforation) and the relatively low impedance electrical current path between the detection surface 111 and the second conductive surface 103 (caused by an intrusion or perforation).

In response to one or more commands issued by the external NFC/RFID interrogator 451, the input sensing block 409 of the NFC/RFID integrated circuit 301' can be configured to sense and detect the voltage signal at the input terminal 415, discriminate between the relatively high impedance electrical current path between the first and second conductive layers (absent any intrusion or perforation) and the relatively low impedance electrical current path between the first and second conductive layers (caused by an intrusion or perforation) by comparing the voltage signal to a threshold level or other signal processing, and register data that represents the relatively high impedance electrical current path (or relatively low electrical current path) for the detection surface 111 based on such discrimination. The controller of the NFC/RFID integrated circuit 301' can process the registered data in order to detect that an intrusion or perforation has occurred, and output a signal indictor based thereon for communication to the external NFC/RFID interrogator 451. For example, if the detected voltage signal and resulting data value corresponds to the relatively high impedance electrical current path between the first and second conductive layers (absent any intrusion or perforation in the detection surface 111), the controller can output an "intrusion detection pass" signal for communication to the external NFC/RFID interrogator 451 where the "intrusion detection pass" signal indicates the absence of suspected tampering by intrusion or perforation of the packing system. In another example, if the detected voltage signal and resulting data value corresponds to the relatively low impedance electrical current path between the first and second conductive layers (caused by an intrusion or perforation in the detection surface 111), the controller can output an "intrusion detection fail" signal for communication to the external NFC/RFID interrogator 451 where the "intrusion detection fail" signal indicates the presence of suspected tampering by intrusion or perforation of the packing system. The external NFC/RFID interrogator 451 can analyze the data communicated from the NFC/RFID integrated circuit 301' to interpret the data as a signal of the intrusion or perforation (for example, by comparing the data to the expected data value(s) representing an intrusion or non-intrusion event), and output an indication (e.g., visual or audible notification) of the intrusion or perforation if and when detected.

In embodiments, the transformative material of the multilayer laminate structure can include a metal ion solution (e.g., silver nitrate gel solution) that is displaced (or flows) or undergoes a galvanic displacement reaction that precipitates solid-phase metal (e.g., silver) in response to intrusion through the multilayer laminate structure, where the displacement or the precipitation of the solid-phase metal or both changes the impedance between the first and second conductive layers to form a relatively low impedance electrical current path between the first and second conductive layers of the multilayer laminate structure.

According to the present disclosure, the multilayer laminate structure as described herein can be adapted to form a set of distinct sections or fingers. One or more pairs of fingers in the set are electrically-connected to one another by metal traces or wires or other suitable conductive material, while the other pairs of fingers in the set are electrically-disconnected from one another by insulating material, insulating void space or other suitable insulating material. The set of fingers are electrically coupled to corresponding input terminals of a first NFC/RFID integrated circuit, which is also coupled to a coil antenna and integrated as part the packaging system. In response to one or more commands communicated by an external NFC/RFID interrogator, the first NFC/RFID integrated circuit can be configured to sense and decode voltage signals received at its input terminals. The electrical connection(s) and disconnection(s) of the fingers and the interconnection of the fingers to the input terminals of the first NFC/RFID integrated circuit are dictated by the known design and manufacture of the packaging system. The particular design will produce voltage signals at the input terminals of the first NFC/RFID integrated circuit that decode to a predefined codeword. This predefined codeword is associated with genuine packaged goods and is used to distinguish the genuine packaged goods from counterfeit or falsified goods.

More specifically, an attempt to copy the packaging design for counterfeit or falsified goods will require that the copy replicate the electrical connection(s) and disconnection(s) of the finger pairs and the interconnection of the fingers to the input terminals of the first NFC/RFID integrated circuit. Such replication can be made very difficult to accomplish (for example, by obfuscating or hiding the interconnection between fingers and by laying out and interconnecting the fingers in a complex or random pattern), and failure to do so will produce voltage signals at the input terminals of the first NFC/RFID integrated circuit that do not decode to the predefined codeword. The first NFC/RFID integrated circuit can be configured to detect and register mismatch between the predefined codeword and the codeword detected by sensing and decoding the voltage signals received at the input terminals of the first NFC/RFID integrated circuit, and output a signal indictor based thereon for communication to the NFC/RFID interrogator. For example, the signal indicator can indicate the absence of suspected counterfeit or falsified goods in the event that the voltage signals produced at the input terminals of the NFC/RFID integrated circuit do decode to the predefined codeword. In another example, the signal indicator can indicate the presence of suspected counterfeit or falsified goods in the event that the voltage signals produced at the input terminals of the first NFC/RFID integrated circuit do not decode to the predefined codeword.

The packaging system can also include a second NFC/RFID integrated circuit, which can be coupled to the same coil antenna (shared with the first NFC/RFID integrated circuit) or coupled to its own coil antenna. The set of fingers of the multilayer laminate structure are also electrically coupled to corresponding input terminals of the second NFC/RFID integrated circuit. In response to one or more commands communicated by the external NFC/RFID interrogator, the second NFC/RFID integrated circuit can be configured to sense the voltage signals received at its input terminals. Absent any intrusion or perforation, the multilayer laminate structure provides a relatively high impedance electrical current path between the first and second conductive layers of the multilayer laminate structure, and the fingers of the multilayer laminate structure produce voltage signals at the input terminals of the second NFC/RFID integrated circuit that represent this relatively high impedance electrical current path. However, an intrusion or perforation causes the transformative material of the multilayer laminate structure to undergo a state change that changes impedance between the first and second conductive layers. This impedance change results in relatively low impedance electrical current path between the first and second conductive layers of the multilayer laminate structure, and one or more fingers of the multilayer laminate structure in the vicinity of the intrusion can produce voltage signals at the input terminals of the second NFC/RFID integrated circuit that represent this relatively low impedance electrical current path. The second NFC/RFID integrated circuit can be configured to sense the voltage signals at its input terminals, discriminate between the relatively high impedance electrical current path between the first and second conductive layers (absent any intrusion or perforation) and the relatively low impedance electrical current path between the first and second conductive layers (caused by an intrusion or perforation) by comparing the voltage signals to threshold levels or other signal processing, register data that represents the relatively high impedance electrical current path (or relatively low electrical current path) for each one of the fingers based on such discrimination, and output a signal indictor based on such data for communication to the NFC/RFID interrogator. For example, the signal indicator can indicate the presence of suspected tampering of the packing system by an intrusion or perforation in the event that one or more voltage signals produced at the input terminals of the additional NFC/RFID integrated circuit correspond to a relatively low impedance electrical current path between the first and second conductive layers caused by an intrusion or perforation. In another example, the signal indicator can indicate the absence of suspected tampering of the packing system by an intrusion or perforation in the event that the voltage signals produced at the input terminals of the additional NFC/RFID integrated circuit correspond to a relatively high impedance electrical current path between the first and second conductive layers.

Figure 5A:
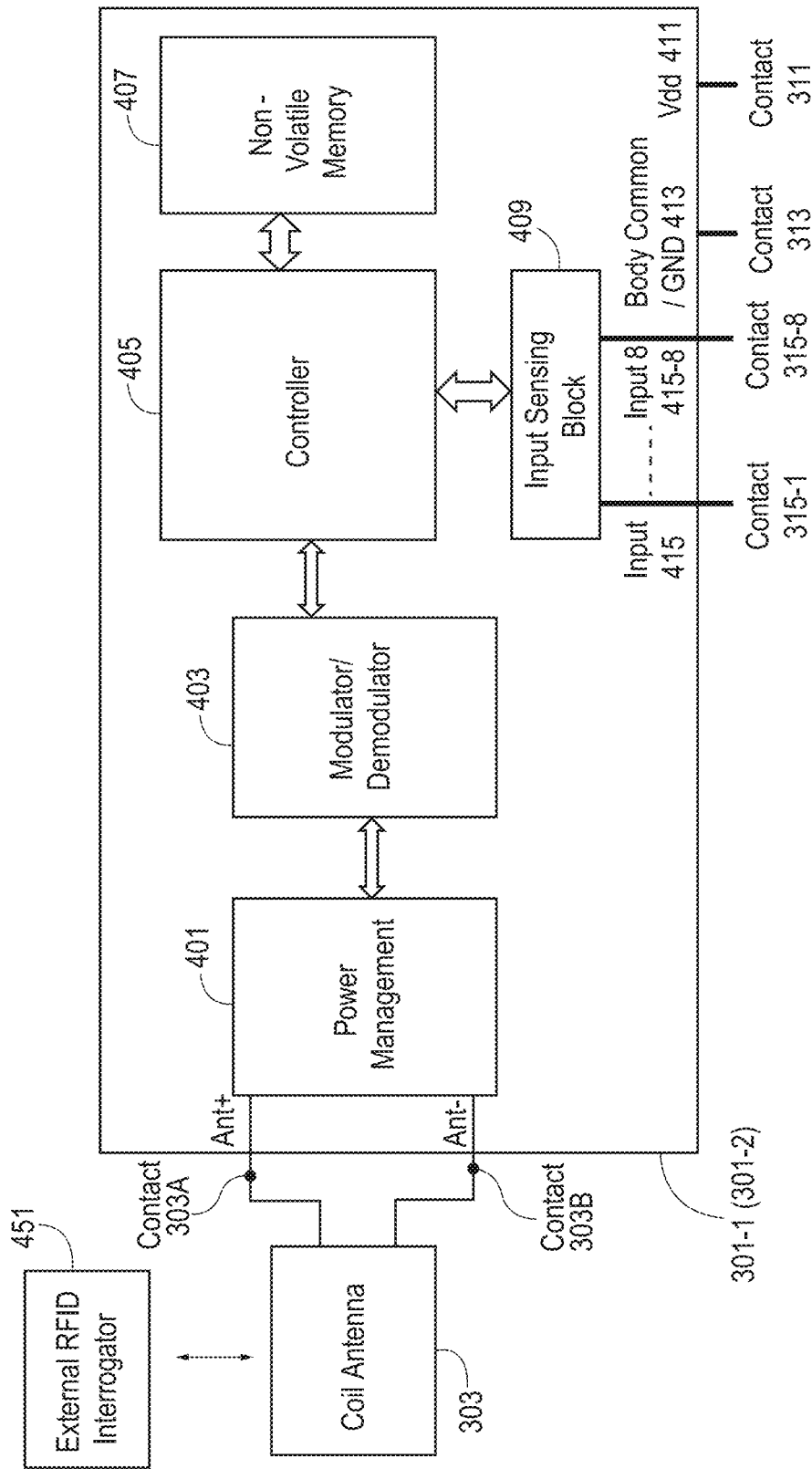
FIG. 5A is a functional block diagram of an NFC/RFID integrated circuit and coil antenna with electrical interconnection between terminals of the NFC/RFID integrated circuit and elongate fingers of the multilayer laminate structure of FIGS. 5B-5F.

FIGS. 5A-5F illustrate a method of forming a packaging system that includes a multilayer laminate structure that includes a set of distinct sections or fingers with two separate NFC/RFID integrated circuits (labeled 301-1 and 301-2) that shared a common coil antenna 303. In this embodiment, the NFC/RFID integrated circuits 301-1, 301-2 are similar to the NFC/RFID integrated circuit 301' as described above with respect to FIG. 4A; however, the input sensing block 409 of the respective NFC/RFID integrated circuits 301-1, 301-2 includes multiple input terminals 411, such as eight input terminals 415-1, 415-2, . . . 415-8 as shown in FIG. 5A. In this configuration, the input sensing block 409 can be configured to sense and detect the voltage signals at each one of the multiple input terminals 415.

Figure 5B:
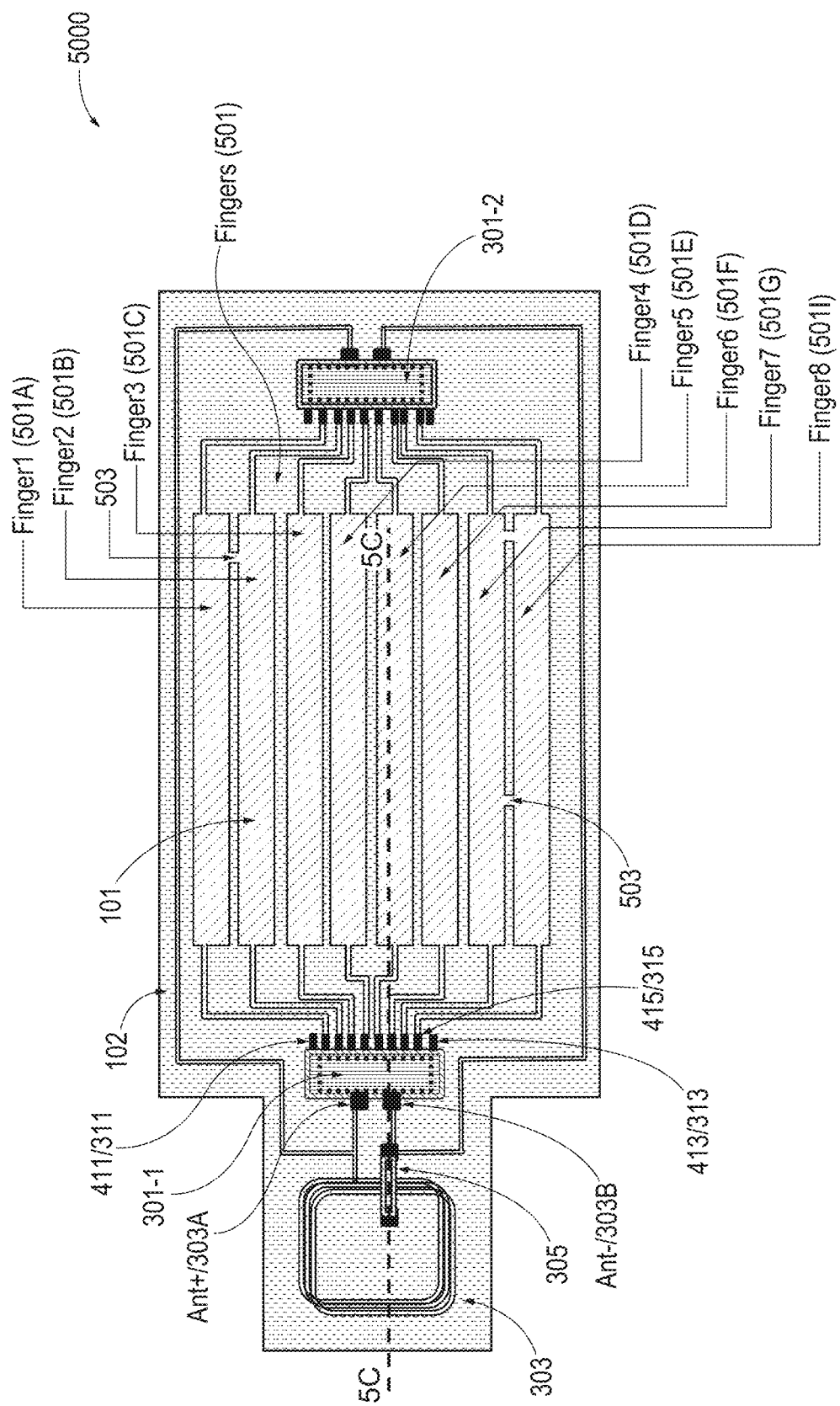
FIGS. 5B-5F are schematic diagrams that illustrate a method of forming a packaging system that includes a multilayer laminate structure with two NFC/RFID integrated circuits and shared coil antenna.
Figure 5C:
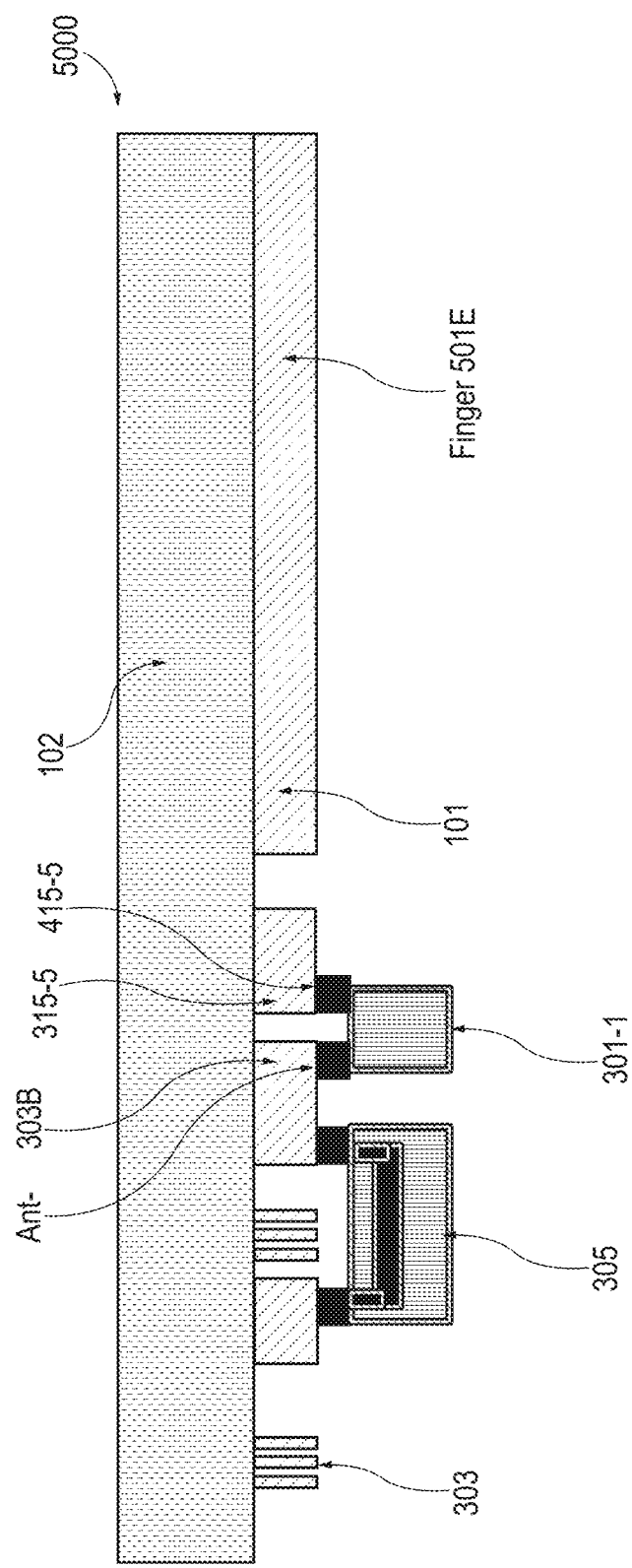

Furthermore, the first conductive layer 101 is formed on a flexible electrically-insulating substrate 102 and patterned to define local features formed from the first conductive layer 101. As best shown in FIGS. 5B and 5C, the local features can include one or more loops of the coil antenna 303, antenna contacts 303A, 303B and corresponding interconnects that support a jumper 305 over the loops of the coil antenna 303, input contacts 315 and interconnects that extend to a corresponding set of fingers 501 (for example, eight fingers 501A . . . 501H) that are electrically coupled to the corresponding inputs contacts and corresponding input terminals of the NFC/RFID integrated circuits 301-1 and 301-2 as shown, and a $V_{dd}$ contact 311 and ground or common body contact 313 for each NFC/RFID integrated circuit 301-1 and 301-2.

In embodiments, the patterned first conductive layer 101 with such local features can be formed by suitable printing technologies, such as continuous gravure or rolled based printing, roll-to-roll printing, stamp printing or inkjet printing. Various microprinting and/or etching technologies can also be used if desired. The NFC/RFID integrated circuits 301-1 and 301-2 are then mounted or interconnected to the patterned conductive layer 101 using suitable interconnect structures (such as ball-type interconnects). In this configuration, the input contact 315, the two antenna contacts 303A and 303B, the $V_{dd}$ contact 311, and the ground or common body contact 313 are configured to interconnect to corresponding terminals of the corresponding NFC/RFID integrated circuits, which is shown in FIG. 5C for the NFC/RFID integrated circuit 301-1. Similar contacts and interconnects are provided for the NFC/RFID integrated circuit 301-2.

Figure 5D:
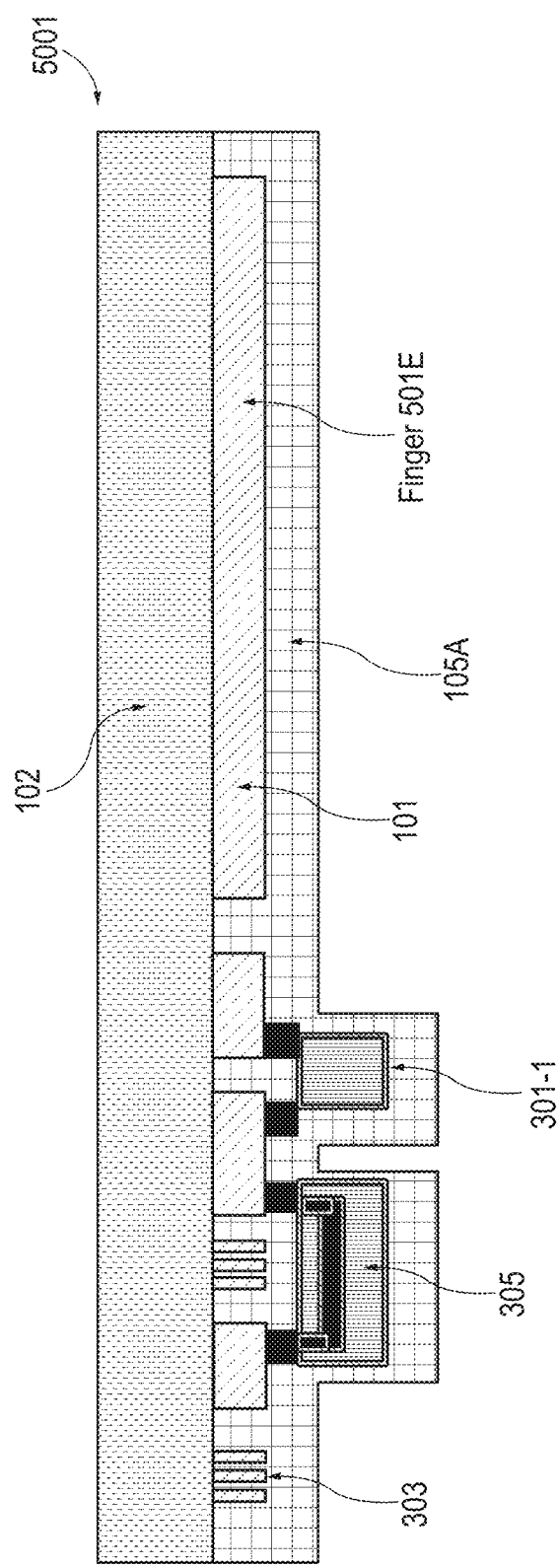

The patterned first conductive layer 101 with the NFC/RFID integrated circuits 301-1 and 301-2 mounted and interconnected thereon is then covered by the electrically-insulating intermediate layer 105A to form a resultant structure 531, which is shown in FIG. 5D for the NFC/RFID integrated circuit 301-1. In embodiments, the intermediate layer 105A can be formed from a thin film of electrically-insulating material such as polyethylene terephthalate (PET), Polyethelene (PE), Polyimide (kapton), photo-resist polymer, Mylar, a spun polymer with a metallic oxide coating, or other suitable encapsulating or insulating material.

Figure 5E:
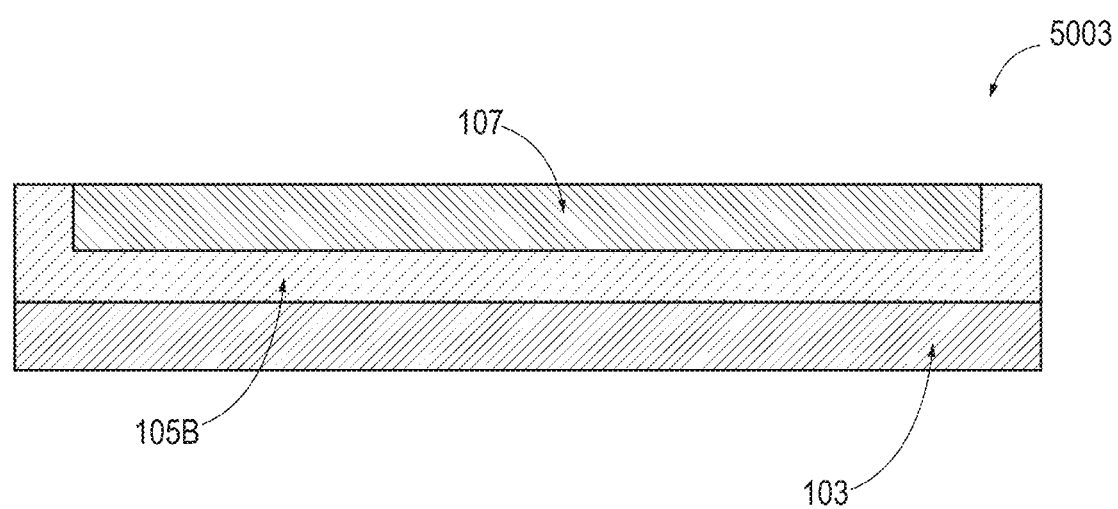

Separately, a multilayer structure 533 is formed that includes the transformative material 107, intermediate layer 105B and conductive layer 103 as shown in FIG. 5E. The multilayer structure 533 is similar to the multilayer laminate structure of FIGS. 1A-1C with the first conductive layer 101 and intermediate layer 105A removed. In embodiments, the multilayer structure 533 can be formed by suitable printing technologies, such as continuous gravure or rolled based printing, roll-to-roll printing, stamp printing or inkjet printing. Various microprinting technologies can also be used if desired.

Figure 5F:
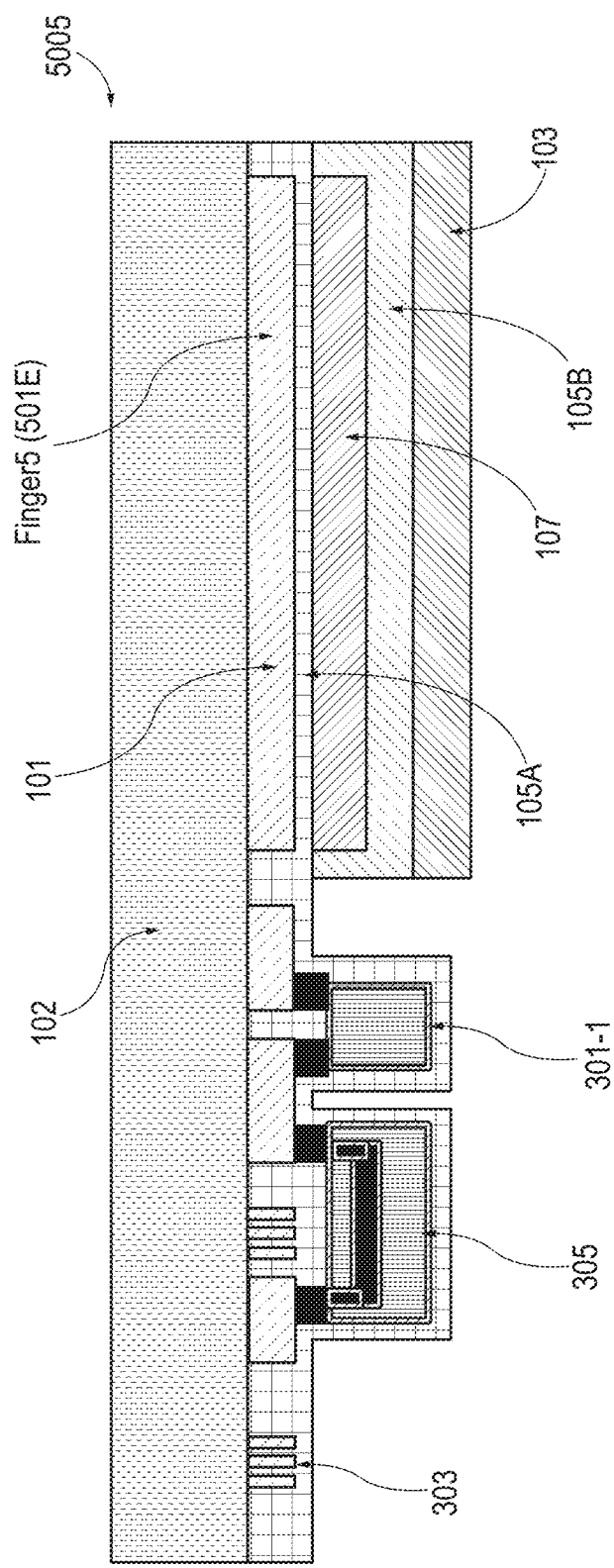

The multilayer structure 533 is then bonded (for example with a thin adhesive layer) or otherwise joined to the resultant structure 531 such that the transformative material 107 is encapsulated by the intermediate layers 105A, 105B in the area that underlies the set of fingers (e.g., fingers 501A . . . 501H), which is shown in FIG. 5F as the finger 501E. In this configuration, the transformative material 107 can be configured to change impedance between the particular finger of the set and the other conductive layer 103 in response to a perforation in the particular finger. The layers of the bonded laminate structure may be thin flexible sheets such that the bonded laminate structure is flexible in nature and thus is able to bend or fold.

Figure 6:
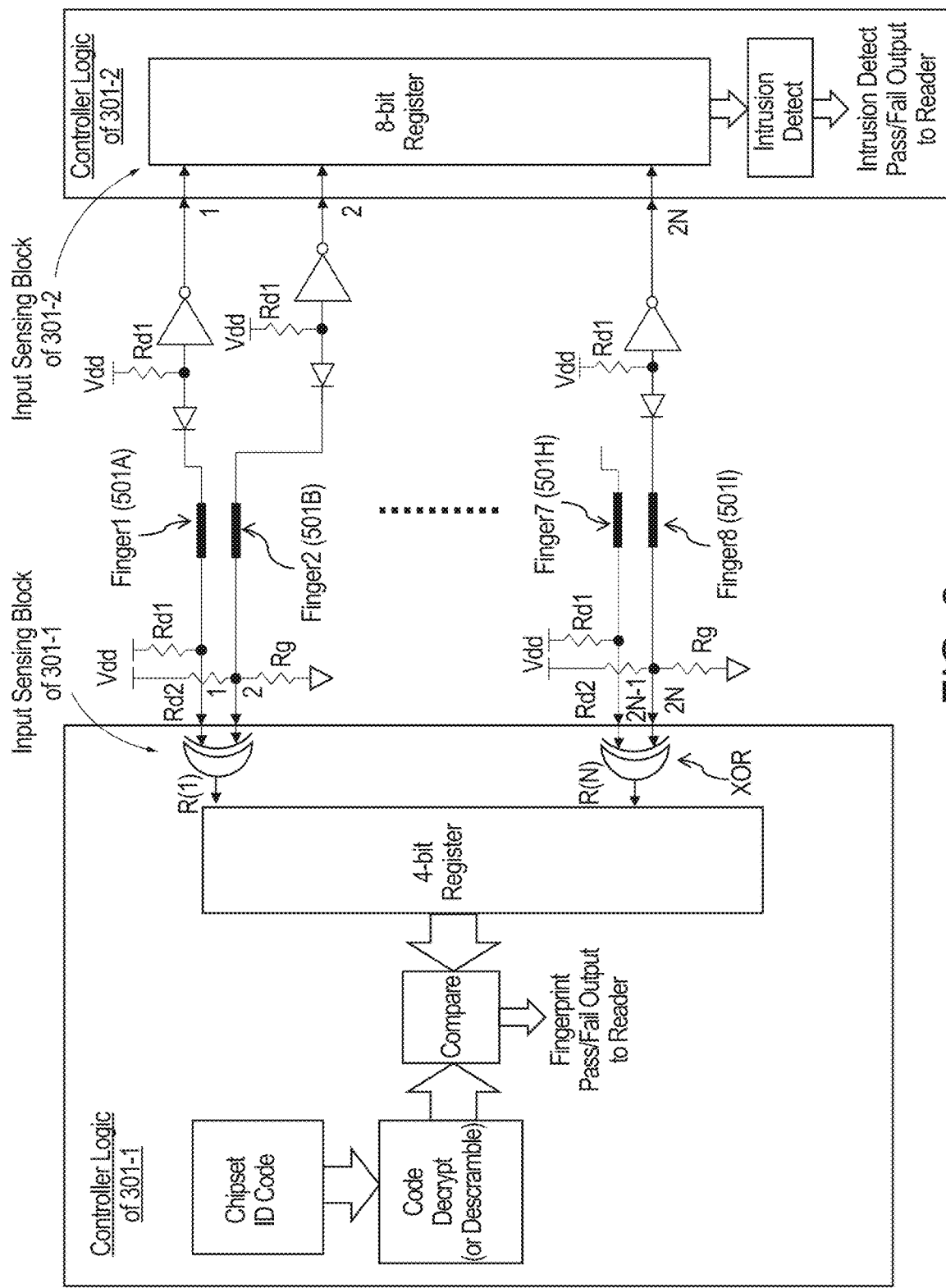
FIG. 6 is a schematic block diagram showing functionality that is part of the two NFC/RFID integrated circuits of FIG. 5A together with the electrical circuitry of the packaging system that interfaces to the two NFC/RFID integrated circuits.

In embodiments, a network of resistors $R_{pu1}$, $R_{p1}$ and $R_{g1}$ can be electrically coupled between adjacent finger pairs and the corresponding input terminals of the NFC/RFID integrated circuit 301-1 as shown in FIG. 6. For each adjacent finger pair, the resistors $R_{pu1}$ and $R_{p1}$ are electrically coupled between the $V_{dd}$ terminal 411 of the NFC/RFID integrated circuit 301-1 and both corresponding fingers of the pair (e.g., fingers 501A and 501, or fingers 501G and 501H as shown), and the resistor $R_{g1}$ is electrically coupled between the common body or ground terminal 413 of the NFC/RFID integrated circuit 301-1 and the one finger of the pair (e.g., finger 501B for the pair 501A, 501B, or finger 501H for the pair 501G, 501H as shown). A connector (not shown), which can be a soldered insulating wire or other suitable means, can be electrically connected between the common body or ground terminal 413 of the NFC/RFID integrated circuit 301-2 (or the contact 313) and the second conductive layer 103 in a manner similar to that shown in FIG. 4B.

In embodiments, the values for the resistors $R_{pu1}$, $R_{p1}$ and $R_{g1}$ of the resistor networks can be selected such that the parallel resistance of $R_{pu1}$ and $R_{p1}$ ($R_{pu1}//R_{p1}$) is less than $R_{g1}$, and $R_{g1}$ is less than $R_{pu1}$. These conditions can provide voltage signals at the input terminals of the NFC/RFID integrated circuit 301-1 for the corresponding pairs of fingers that allows for discrimination and registration of the interconnection state (or disconnection state) of the corresponding finger pair.

For example, consider an example where the $V_{dd}$ terminal 411 of the NFC/RFID integrated circuit 301-1 produces a $V_{dd}$ voltage of 2V, $R_{pu1}$ and $R_{p1}$ are given as 100 Kohms, and $R_{g1}$ is given as 75 Kohms. In this case, the parallel resistance ($R_{pu1}//R_{p1}$) is 50 Kohms, which is less than the 75 Kohms of $R_{g1}$, and the 75 Kohms of $R_{g1}$ is less than the 100 Kohms of $R_{pu1}$. When an adjacent pair of fingers is electrically-connected to one another, the voltage signal produced that the corresponding input terminals of the NFC/RFID integrated circuit 301-1 is expected to be 1.2 volts. This voltage signal is common for both input terminals and is due to the voltage drop from $V_{dd}$ due to the parallel resistance ($R_{pu1}//R_{p1}$) in series with the resistor $R_{g1}$. The parallel resistance ($R_{pu1}//R_{p1}$) results from the electrical connection of the finger pair. However, when an adjacent pair of fingers is electrically-disconnected from one another, the voltage signal produced that the corresponding input terminals of the NFC/RFID integrated circuit 301-1 changes. Specifically, for the input terminal that is electrically coupled to a finger of the pair and both resistors $R_{p1}$ and $R_{g1}$ (e.g., finger 501B or finger 501H), the voltage signal is expected to be 0.86 volts. This voltage signal is due to the voltage drop from $V_{dd}$ due to the resistance $R_{p1}$ in series with resistor $R_{g1}$. And for the input terminal that is electrically coupled to the other finger of the pair and only the pull-up resistor $R_{pu1}$ (e.g., finger 501A or finger 501G), the voltage signal is expected to be 2 volts.

Furthermore, a network of pull-up resistors $R_{pu2}$, protection diodes and inverter circuits can be electrically coupled between the fingers (e.g., fingers 501A . . . 501I) and the corresponding input terminals of the NFC/RFID integrated circuit 301-2 as shown in FIG. 6. The pull-up resistors $R_{pu2}$ are electrically coupled between the $V_{dd}$ terminal 411 of the NFC/RFID integrated circuit 3-2 and the corresponding fingers (e.g., fingers 501A . . . 501H). The protection diodes protect against reverse current flow from the input terminals of the NFC/RFID integrated circuit 301-2 to the fingers. The inverter circuits provide for discrimination between the relatively high impedance electrical current path between the first and second conductive layers (absent any intrusion or perforation) and the relatively low impedance electrical current path between the first and second conductive layers (caused by an intrusion or perforation). A connector (not shown), which can be a soldered insulating wire or other suitable means, can be electrically connected between the common body or ground contact of the NFC/RFID integrated circuit 301-2 and the second conductive layer 103 in a manner similar to that shown in FIG. 4B.

Note that the area covered by the fingers (e.g., fingers 501A . . . 501H) is generally rectangular in shape. However, in other embodiments, the area covered by the fingers (e.g., fingers 501A . . . 501H) can be any other arbitrary sharp, including linear shapes and non-linear shapes. In embodiments, the area covered by the fingers (e.g., fingers 501A . . . 501H) can be configured such that the set of fingers encompass a part, all or nearly all of the area of the protection barrier of the packaging system.

In this embodiment, the NFC/RFID integrated circuit 301-1 can include non-volatile memory and a controller (or other electronic circuitry). The non-volatile memory of the NFC/RFID integrated circuit 301-1 can be configured to store code data (labeled as Chipset ID code in FIG. 6) that can be read by the controller and processed (for example, by decrypting or descrambling the code data) to reproduce the predefined codeword associated with the genuine goods protected by the packaging system. In response to command(s) issued by the external NFC/RFID interrogator, the controller can read the code data stored in the non-volatile memory and reproduce the predefined codeword as shown in FIG. 6. In conjunction with such processing, the NFC/RFID integrated circuit 301-1 can sense the voltage signals produced at the input terminals of the NFC/RFID integrated circuit 301-1, decode the signals using XOR logic gates to generate a sensed codeword, and store the sensed codeword in a register (e.g., the 4-bit register of FIG. 6). The controller can compare the sensed codeword stored in the register to the predefined codeword as reproduced from the stored code data, and output a signal indictor based on the results of the comparison for communication to the external NFC/RFID interrogator as shown in FIG. 6. For example, if the sensed codeword matches the predefined codeword, the controller can output a "fingerprint pass" signal for communication to the NFC/RFID interrogator where the "fingerprint pass" signal indicates the absence of suspected counterfeit or falsified goods. In another example, if the sensed codeword does not match the predefined codeword, the controller can output a "fingerprint fail" signal that indicates the presence of suspected counterfeit or falsified goods. In this manner, the operational characteristic of the NFC/RFID integrated circuit 301-1 can be ascertained and analyzed (for example, by suitable operations of an external NFC/RFID interrogator) to detect and register suspected counterfeit or falsified goods of the packaging. Note that the functionality of the controller can also be carried out by suitable signal processing and logic circuits.

In other embodiments, the network of resistors $R_{pu1}$, $R_{p1}$ and $R_{g1}$ (or other suitable electrical circuit components) together with the electrical connections or disconnections between the fingers of the packaging system can provide an input vector signal to the input terminals of the NFC/RFID integrated circuit 301-1. This input vector signal can be derived by sampling the voltage signals produced by the fingers at the same time, or by sampling a sequence of the fingers over time (for example, using multiplexer circuitry or a configurable cross-connect that is part of the NFC/RFID integrated circuit 301-1 located internally in the chipset). The input vector signal can then be decoded to determine the sensed codeword, and the sensed codeword can be compared to the predefined codeword in order to generate and output the appropriate output signal as described herein. In practice, there are many ways that the decode circuitry of the NFC/RFID integrated circuit 301-1 can be designed to obfuscate the predefined codeword maintained by the NFC/RFID integrated circuit 301-1 in order to make it difficult to be reverse engineered. In short, the decode circuitry can be modeled as a function $F(V)$ of the input vector $V=\{V1\_input, \ldots Vn\_input\}$—the voltage levels of the fingers. The decode circuitry can be further complicated by making it a sequence of functions Fn which outputs a different value for the same input vector in some pseudo-random fashion, each time it is read. For example, the sequence of functions $Fn(V)$ can be determine by a counter which keeps count of how many times the device is read. Even further complexity can be introduced by public private key encryption or other suitable methods, if so desired.

The NFC/RFID integrated circuit 301-2 can include a controller (or other electronic circuitry) as shown in FIG. 6. In response to command(s) issued by the external NFC/RFID interrogator, the NFC/RFID integrated circuit 301-2 can sense the voltage signals produced at its input terminals, discriminate between the relatively high impedance electrical current path between the first and second conductive layers (absent any intrusion or perforation) and the relatively low impedance electrical current path between the first and second conductive layers (caused by an intrusion or perforation) by comparing the voltage signals to threshold levels or other signal processing, and register data that represents the relatively high impedance electrical current path (or relatively low electrical current path) for each one of the fingers based on such discrimination. The controller of the NFC/RFID integrated circuit 301-2 can process the registered data in order to detect that an intrusion or perforation has occurred, and output a signal indictor based thereon for communication to the NFC/RFID interrogator. For example, if the detected voltage signals and resulting data values correspond to the relatively high impedance electrical current path between the first and second conductive layers (absent any intrusion or perforation), the controller can output an "intrusion detection pass" signal for communication to the NFC/RFID interrogator where the "intrusion detection pass" signal indicates the absence of suspected tampering by intrusion or perforation of the packing system. In another example, if any one of the detected voltage signals and resulting data values correspond to the relatively low impedance electrical current path between the first and second conductive layers (caused by an intrusion or perforation), the controller can output an "intrusion detection fail" signal for communication to the NFC/RFID interrogator where the "intrusion detection fail" signal indicates the presence of suspected tampering by intrusion or perforation of the packing system. In this manner, the operational characteristic of the NFC/RFID integrated circuit 301-2 can be ascertained and analyzed (for example, by suitable operations of an external NFC/RFID interrogator) to detect and register the suspected tampering of the packaging that results in an intrusion or perforation through at least part of the multilayer laminate structure. Note that the functionality of the controller of the NFC/RFID integrated circuit 301-2 can also be carried out by suitable signal processing and logic circuits.

Figure 7:
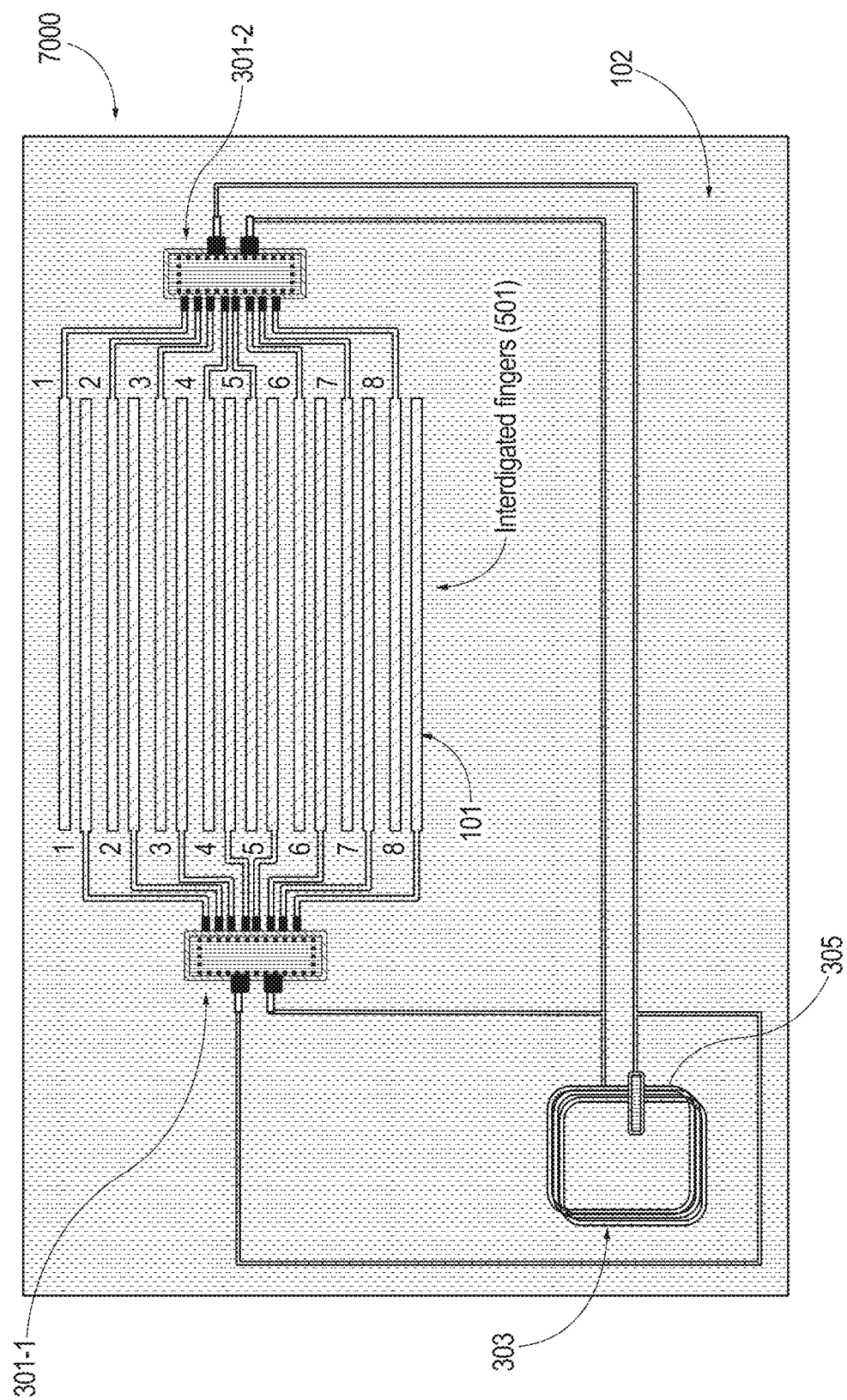
FIG. 7 is a schematic diagram that shows fingers of the multilayer laminate. structure that are interconnected to the two different NFC/RFID integrated circuits formed with an interdigitated layout.

In other embodiments, the fingers 501 that are interconnected to the NFC/RFID integrated circuit 301-1 can be separate from the fingers 501 that are interconnected to the NFC/RFID integrated circuit 301-2, and such separate fingers can be formed with an interdigitated layout 7000 as shown in FIG. 7. In this embodiment, the fingers can be interdigitated in a side-by-side manner as co-planar local features patterned from the conductive layer 101 as shown. Note that the NFC/RFID integrated circuits 301-1 and 301-2 share a common antenna. In other embodiments, the NFC/RFID integrated circuits 301-1 and 301-2 can be coupled to separate antennae.

In other embodiments, the functionality of the NFC/RFID integrated circuits 301-1, 301-2 can be embodied in a single NFC/RFID integrated circuit, for example as part of the NFC/RFID integrated circuits 301-1. In this configuration, the opposite ends of the fingers 501 can be interconnected to corresponding input terminals of the single NFC/RFID integrated circuit, and the NFC/RFID integrated circuits 301-2 can be omitted from the system.

Figure 8A:
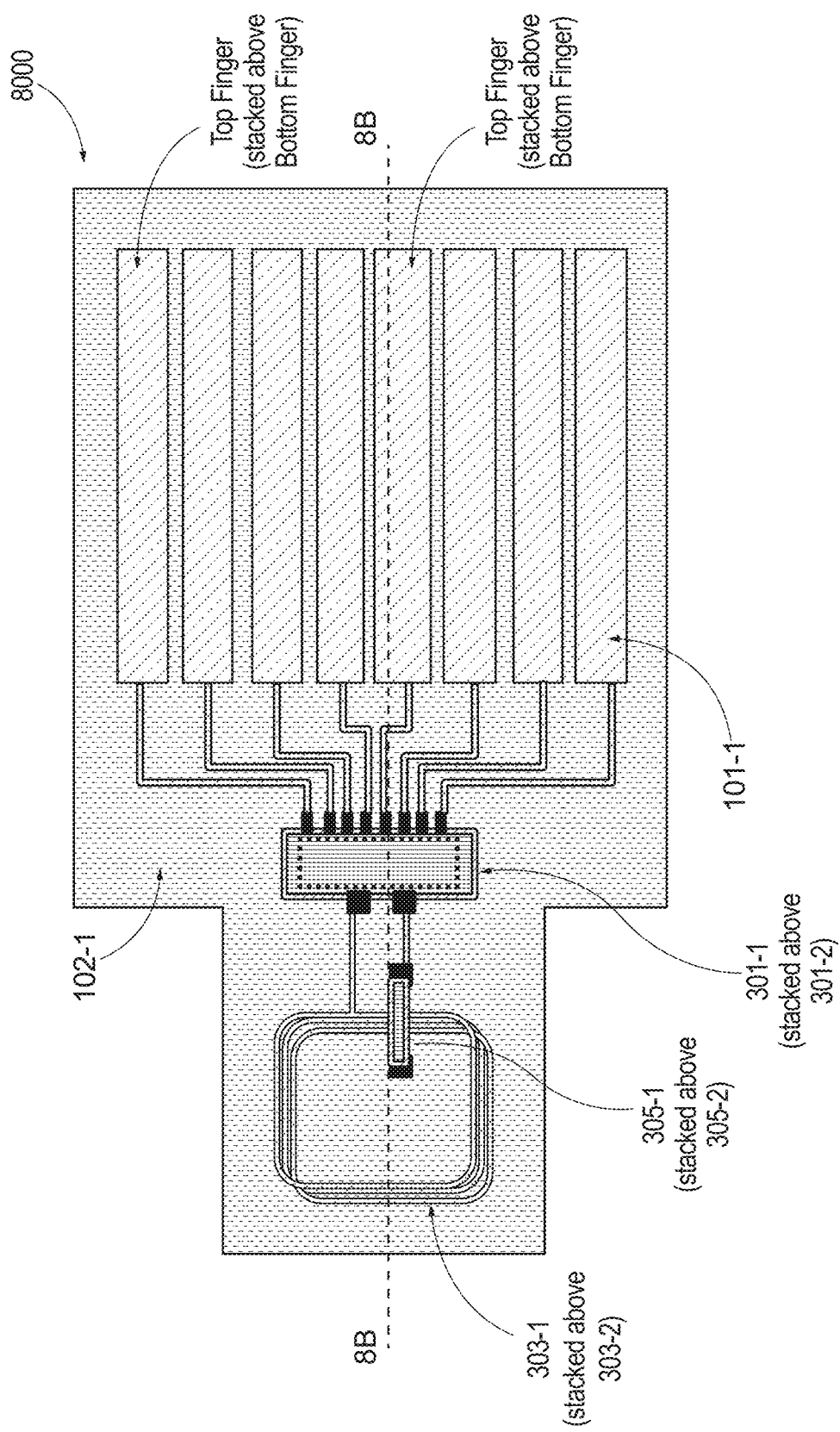
FIGS. 8A-8C are schematic diagrams of a packaging system that employs a plurality of multilayer laminate structures in a stacked configuration (vertically above one another.
Figure 8B:
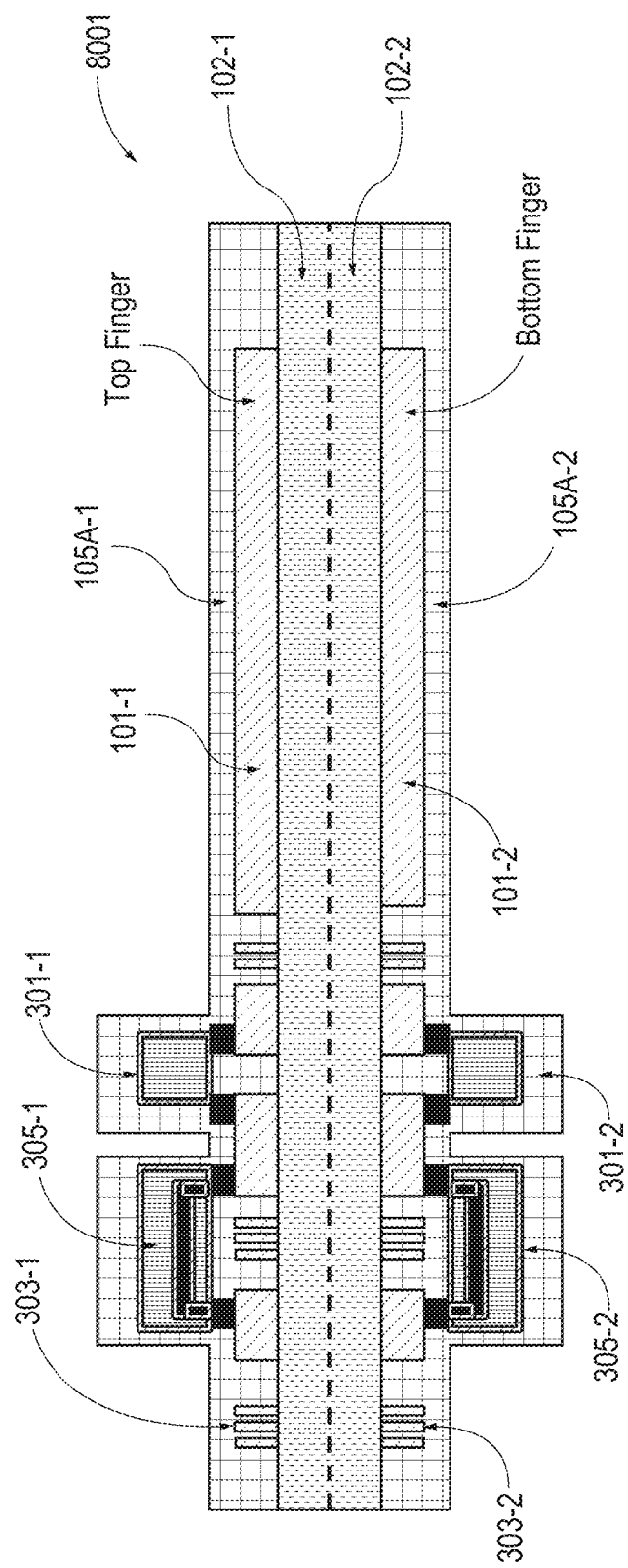
Figure 8C:
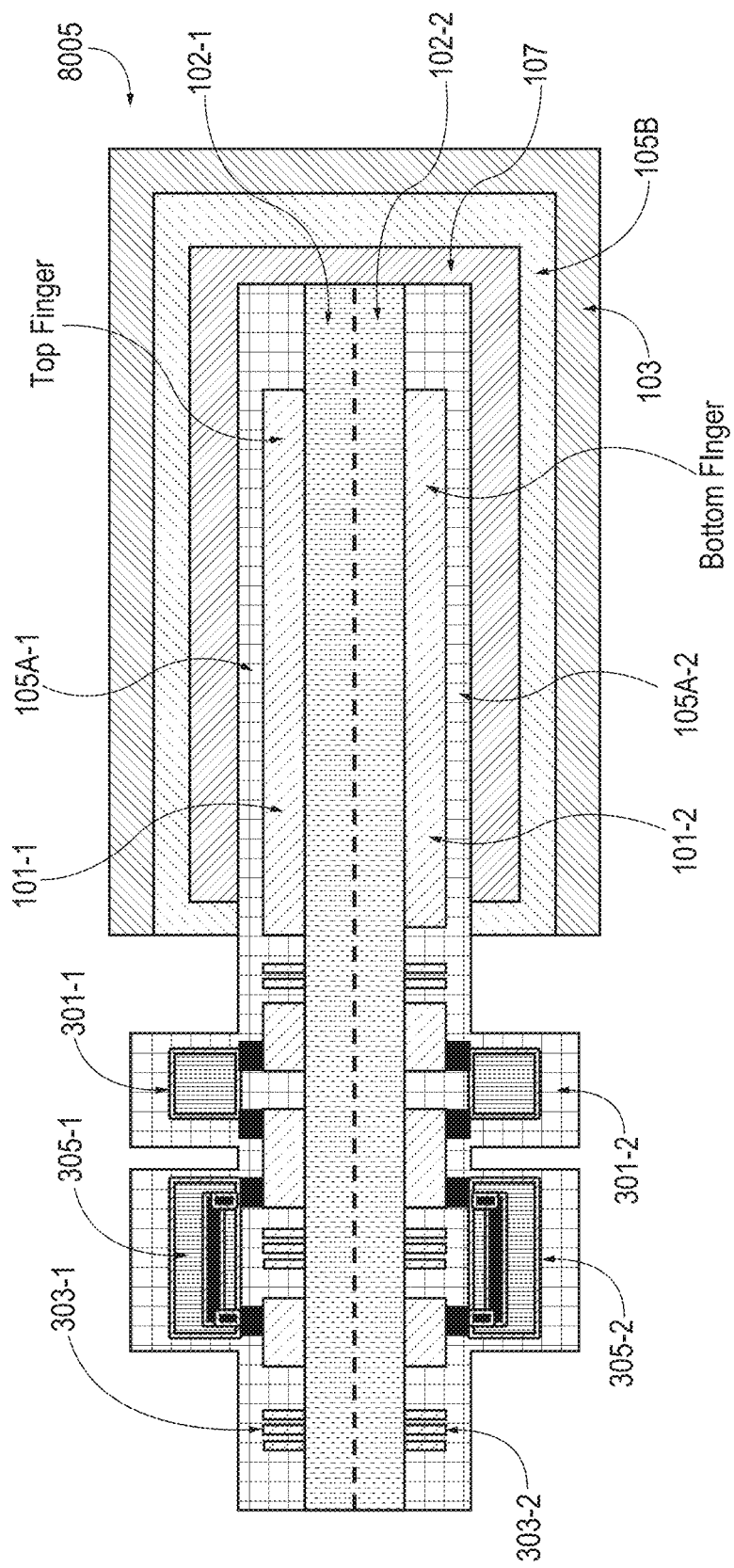

In still other embodiments, a plurality of multilayer laminate structures can be arranged in a stacked configuration 8000 (vertically above one another) as shown in FIGS. 8A and 8B. In this configuration, the fingers of the multilayer laminate structures and the NFC/RFID integrated circuit 301-1 (and corresponding interconnect structures) as described above for falsification analysis are stacked on top of fingers of the multilayer laminate structure and the NFC/RFID integrated circuit 301-2 (and corresponding interconnect structures) as described above for intrusion detection. The stacked configuration 8000 can be encapsulated by the insulating layers 105A-1 and 105A-2 for form the resultant structure 8001 as shown in FIG. 8B. A multilayer structure 533 is formed that includes the transformative material 107, intermediate layer 105B and conductive layer 103 shown in FIG. 5E. The multilayer structure 533 of FIG. 5E can then be bonded (for example with a thin adhesive layer) or otherwise joined to the stacked structure 8001 to produce the resultant structure 8005 as shown in FIG. 8C. In this structure 8005, the transformative material 107 is encapsulated by the intermediate layers 105A, 105B in the top area of the stack that covers the set of fingers for the NFC/RFID integrated circuit 301-1 as well as the bottom area of the stack that covers the set of fingers for the NFC/RFID integrated circuit 301-2, which is shown in FIG. 8C for one of the fingers (labeled top finger) for the NFC/RFID integrated circuit 301-1 and one of the fingers (labeled bottom finger) for the NFC/RFID integrated circuit 301-2. In this configuration, the transformative material 107 can be configured to change impedance between the particular finger and the other conductive layer 103 in response to a perforation in the particular finger. The layers of the multilayer structure 533 may be thin flexible sheets such that the multilayer structure 533 is flexible in nature and thus is able to bend or fold.

Figure 9:
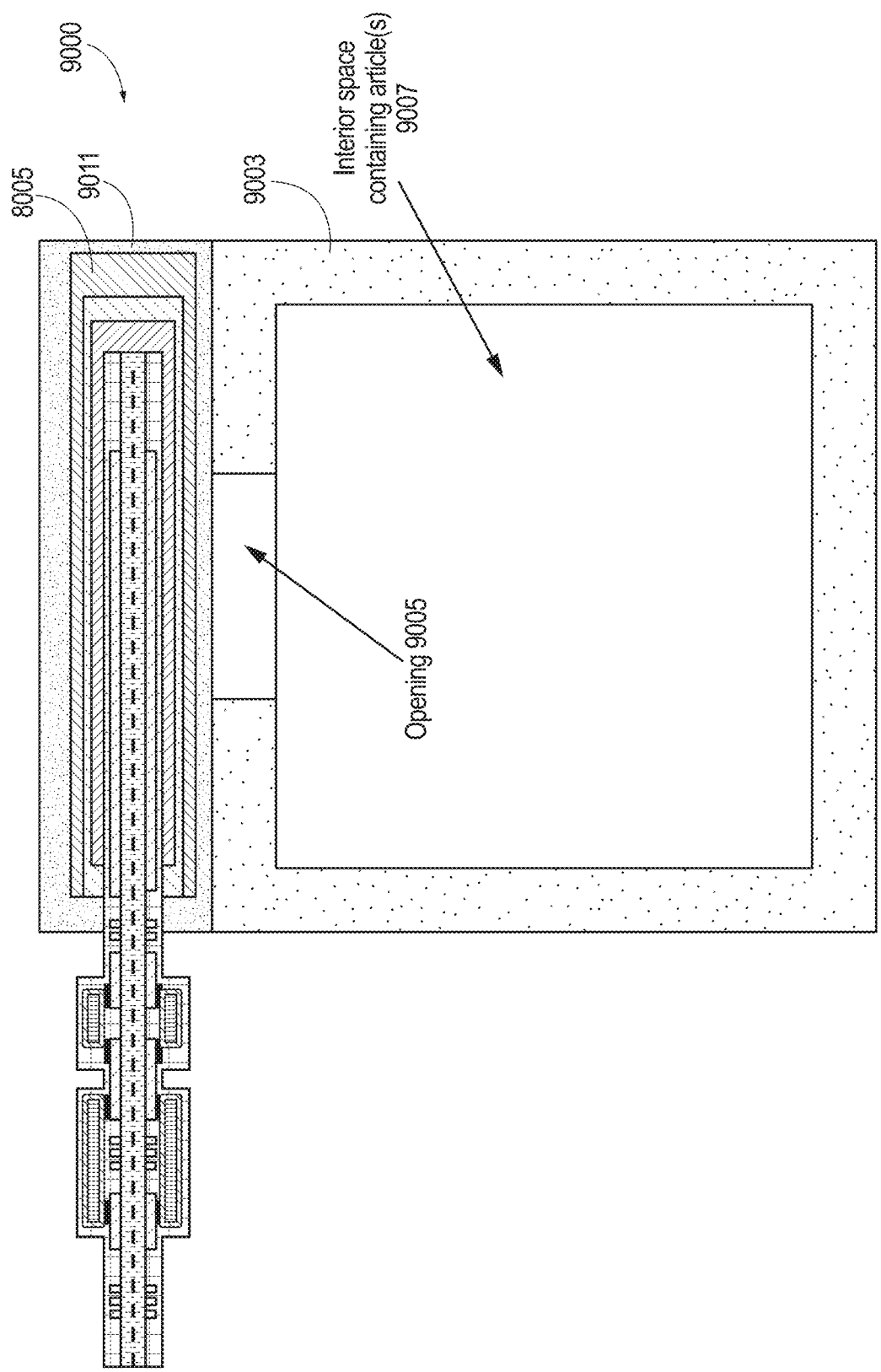
FIG. 9 is a schematic cross-sectional diagrams where the packaging system of FIGS. 8A-8C provides a barrier into the sealed opening of a container.

In embodiments, the packaging system as described herein (the multilayer laminate structure with NFC/RFID integrated circuit(s) and coil antenna(e)) can be used as a sensing barrier or surface that protects the opening into a rigid closed-wall container (such as glass bottle) that houses at least one article. For example, FIG. 9 shows an example embodiment where the packaging system 8005 of FIG. 8C is secured with a sealant 9011 about an opening 9005 into a rigid closed-wall container (such as glass bottle) 9003. In this configuration, the packaging system 8005 provides a partly or wholly sealed protective barrier that can detect and register suspected counterfeit or falsified goods of the packaging as well as intrusion of the interior space 9007 of the container 9003 and communicate data representing such conditions. Note that the multilayer laminate structure of the system 9000 extends laterally across the upper wall of the container 9003 beyond the opening 9005, which offers protection for intrusion at the sealed interface between the container 9003 and the barrier. In embodiments, the sealant 9011 can be an epoxy thermoset sealant, which can be cured by UV light, heat or other means.

In other embodiments, the packaging system as described herein (the multilayer laminate structure with NFC/RFID integrated circuit(s) and coil antenna(e)) can be used as a sensing barrier that defines and protects a sealed envelope or pouch or box or other container.

Figure 10A:
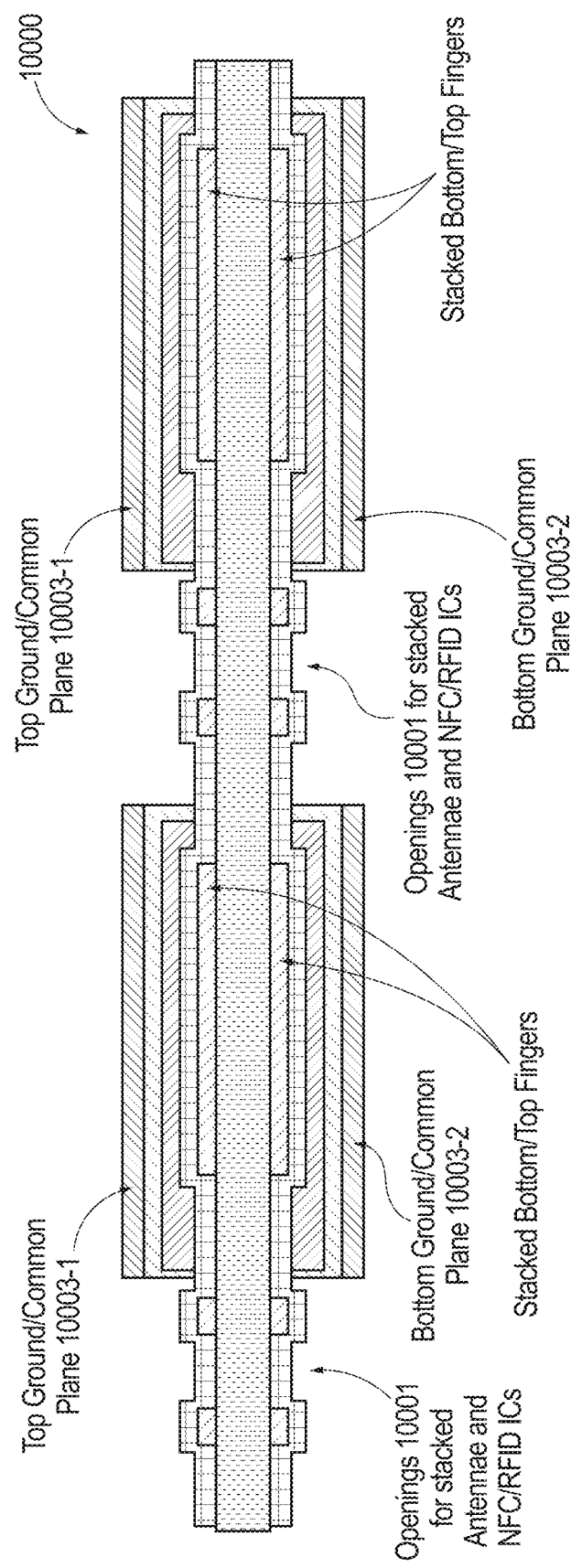
FIGS. 10A and 10B are schematic diagrams of a packaging system that employs a plurality of multilayer laminate structures in a stacked configuration (vertically above one another) that is configured in a sheet or rolled form.
Figure 10B:
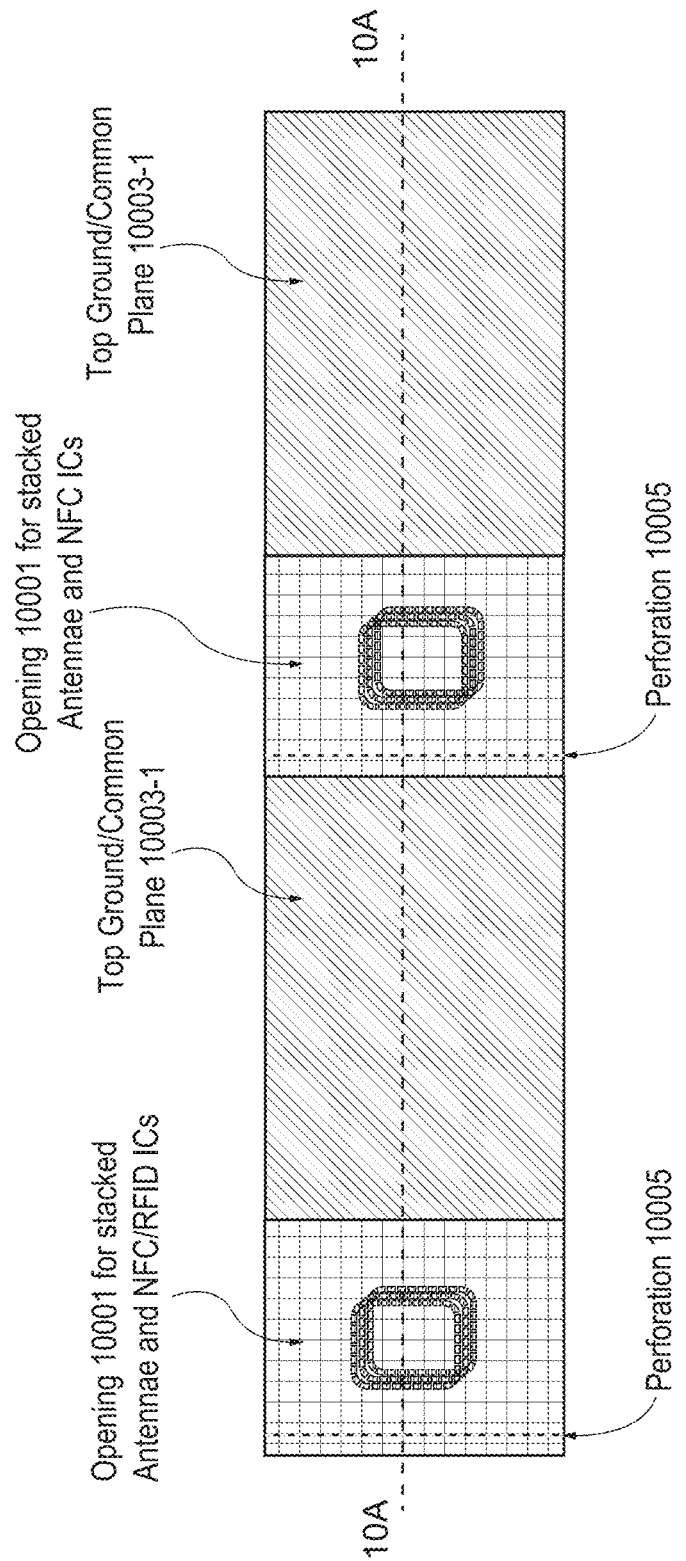

In embodiments, the packaging system as described herein (the multilayer laminate structure with NFC/RFID integrated circuit(s) and coil antenna(e)) can be fabricated in a flexible rolls or sheets. For example, FIGS. 10A and 10B illustrates a flexible sheet or roll 10000 that includes a series of the stacked packaging systems similar to FIG. 8C replicated along the sheet or roll. The sheet or roll includes areas that define openings 10001 for the stacked antennae and NFC/RFID integrated circuits disposed adjacent areas that define the stacked multilayer laminate structures that are interconnected to the stacked antennae and NFC/RFID integrated circuits. Perforations 10005 can be defined that allow the stacked antennae and NFC/RFID integrated circuit as well as the stacked interconnected multilayer laminate structures that are disposed adjacent thereto to be separated from the sheet or roll for use.

The predefined codeword can be assigned to a particular packaged item and the corresponding data can be loaded into the NFC/RFID integrated circuit of the packaging system for the particular packaged item. The assignment of the predefined codeword to the particular packaged item can be varied based on application. For example, the assignment of the predefined codeword to the particular packaged item can be based on product model number, unique serial number, lot or batch number, manufacturing facility, etc. Secondary data analysis operations, for example data analysis operations performed in the cloud or other trusted computing environment, can be used to analyze the data read from the NFC/RFID integrated circuit(s) of the packaging system in order to verify or rule out counterfeiting of the particular packaged item.

In embodiments, the transformative material 107 of the packaging system as described herein can include a metal ion solution (e.g., silver nitrate gel solution) that is displaced (or flows) or undergoes a galvanic displacement reaction that precipitates solid-phase metal (e.g., silver) in response to the intrusion or perforation through the multilayer laminate structure, where the displacement or the precipitation of the solid-phase metal or both changes the impedance between the first and second conductive layers.

In other embodiments, the transformative material 107 of the multilayer laminate structure as described herein can be an electrolyte of other metals or alloys that undergo a galvanic displacement reaction to form a solid-phase precipitate that changes the impedance between the opposed conductive layers of the laminate structure. For example, the electrolyte can include cooper, lead, tin, nickel, cadmium or other metals. In this case, the outer conductive layer of the multilayer laminate structure that contributes to the galvanic displacement reaction can be formed from a less noble metal (which has a lower galvanic potential).

In other embodiments, the multilayer laminate structure can include a chemical reagent that assists or enhances the galvanic displacement reaction or physical change of the transformative material 107 (such as a silver nitrate gel solution). For example, the chemical reagent can be encapsulated by the intermediate layer 105A between the between the first conductive layer 101 and the transformative material 107 (e.g., silver nitrate gel solution). Other configurations can be used to encapsulate the chemical reagent within the multilayer laminate structure in close proximity to the transformative material 107.

In embodiments, the chemical reagent can include a reducing agent (e.g., sodium borohydride) that can be released by the intrusion event and mix with the transformative material 107 to assist in the chemical reaction or physical change of the transformative material that results in the formation of the low impedance current path between the first and second conductive layers 101 and 103. The reducing reagent can be configured to react with the transformative material in response to an intrusion event and aids in the transformation of the transformative material. For illustrative purposes, the chemical reagent can be a solution of sodium borohydride and/or glucose that assists or enhances the galvanic displacement reaction of the silver nitrate solution that precipitates solid-phase silver. The chemical reagent can possibly include other components such as catalysts, stabilizers, surfactants or initiators, in any combination thereof.

In other embodiments, the multilayer laminate structure can include microcapsules of a chemical reagent that are dispersed in a matrix of the transformative material 107. The chemical reagent microcapsules can be formed by a thin film insulator encapsulant that surrounds a small volume of the chemical reagent. The chemical reagent that fills the microcapsules can include a reducing agent (e.g., sodium borohydride) that can be released by the intrusion event and mix with the transformative material 107 to assist in the chemical reaction or physical change of the transformative material that results in the formation of the low impedance current path between the first and second conductive layers 101 and 103. The reducing reagent can be configured to react with the transformative material in response to an intrusion event and aids in the transformation of the transformative material. For illustrative purposes, the chemical reagent can be solution of sodium borohydride and/or glucose that assists or enhances the galvanic displacement reaction of the silver nitrate solution that precipitates solid-phase silver. The chemical reagent can possibly include other components such as catalysts, stabilizers, surfactants or initiators, in any combination thereof.

In other embodiments, the multilayer laminate structure can include microcapsules of the transformative material that are dispersed in a matrix of chemical reagent. The transformative material microcapsules can be formed by a thin film insulator encapsulant that surrounds a small volume of the transformative material (e.g., silver nitrate gel solution). The matrix of chemical reagent includes a reducing agent (e.g., sodium borohydride). The transformative material of the microcapsules can be released by the intrusion event and mix with the chemical reagent matrix to assist in the chemical reaction or physical change of the transformative material that results in the formation of the low impedance current path between the first and second conductive layers 101 and 103. The reagent can be configured to react with the transformative material in response to an intrusion event and aids in the transformation of the transformative material. For illustrative purposes, the chemical reagent matrix can be a solution of sodium borohydride and/or glucose that assists or enhances the galvanic displacement reaction of the silver nitrate solution that precipitates solid-phase silver. The chemical reagent matrix can possibly include other components such as catalysts, stabilizers, surfactants or initiators, in any combination thereof. In this embodiment, the intermediate layers 105A and 105B of the laminate structure can be omitted.

In other embodiments, the multilayer laminate structure can include microcapsules of chemical reagent and microcapsules of transformative material that are both dispersed in an inert matrix. The chemical reagent microcapsules can be formed by a thin film insulator encapsulant that surrounds a small volume of the chemical reagent. The transformative material microcapsules can be formed by a thin film insulator encapsulant that surrounds a small volume of the transformative material (e.g., silver nitrate gel solution). The chemical reagent microcapsules include a chemical reagent (such as a reducing agent of sodium borohydride). The chemical reagent and the transformative material of the microcapsules can be released by the intrusion event and mix with one another in the inert matrix to assist in the chemical reaction or physical change of the transformative material that results in the formation of the low impedance current path between the first and second conductive layers 101 and 103. The chemical reagent can be configured to react with the transformative material in response to an intrusion event and aids in the transformation of the transformative material. For illustrative purposes, the chemical reagent can be a solution of sodium borohydride and/or glucose that assists or enhances the galvanic displacement reaction of the silver nitrate solution that precipitates solid-phase silver. The chemical reagent can possibly include other components such as catalysts, stabilizers, surfactants or initiators, in any combination thereof. Note that in this embodiment, the intermediate layers 105A and 105B of the laminate structure can be omitted.

Details of embodiments that employ chemical reagents and microcapsule forms of the chemical reagents and/or transformative material are set forth in U.S. patent application Ser. No. 16/180,513, filed on Nov. 5, 2018, commonly assigned to assignee of the present application and herein incorporated by reference in its entirety.

In still other embodiments, the second conductive layer 103 can be positioned facing the package product and closest to the packaged product, while the first conductive layer/detection surface 101 is positioned facing away from the package product and furthest from the packaged product. This embodiment is similar to the embodiments as described above; however, the ordering of the layers of the multilayer laminate structure from the inside to outside is inverted with respect the layer ordering of the embodiments described herein.

In another aspect, a method is provided to detect, register, verify and validate that at least one packaged article has or has not experienced intrusion or product falsification or counterfeiting. The method employs a packaging system as described herein where at least one operational characteristic of a first NFC/RFID integrated circuit is dependent on change in impedance of distinct fingers (or a single detection surface) of a multilayer laminate structure in response to an intrusion or perforation, and where at least one operational characteristic of a second NFC/RFID integrated circuit is dependent on a predefined codeword represented by the physical layout of distinct fingers of the same or different multilayer laminate structure. The method can include employing an NFC/RFID interrogator to ascertain the operational characteristic of the first NFC/RFID integrated circuit to detect that the at least one packaged article has or has not experienced intrusion and output an indication (e.g., visual or audible notification) of such intrusion conditions if and when detected. The method can also include employing an NFC/RFID interrogator to ascertain the operational characteristic of the second NFC/RFID integrated circuit to detect that the at least one packaged article is suspected counterfeit or falsified goods and output an indication (e.g., visual or audible notification) of such conditions if and when detected. The NFC/RFID integrated circuit and NFC/RFID interrogator can cooperate to read other information that is related to the packaged article(s) and stored by the NFC/RFID integrated circuit, such as a product identifier, manufacturing information (such as Plant Number and Lot number), quality control information, shipping information, consumer information (e.g., patient compliance to a course of treatment) and other arbitrary information.

The packaging system and associated method can be used for a wide range of articles, including but not limited to the following:
  medicine (e.g., insulin, vaccines, delicate medicines)
  foods or beverages (e.g., dry foods, meats, fruits, vegetables, wines)
  chemicals (process integrity)
  forensics samples (e.g., collected from the scene of a crime)
  electronics (e.g., specialized microchips)
  electro-mechanical products (e.g., airplane parts)
  branded products (e.g., Gucci, Chanel, Wine, Spirits)
  lifestyle personal products (e.g., condoms, sex toys)
  documents or works of art (e.g., confidential and private documents, paper, books, paintings)
  plastics or rubbers (e.g., beads, buttons, utensils and decorations)
  fabrics or leather goods (e.g., clothing, handbags)
  wood (e.g., as used in light construction)
  combinations of these products or other products thereof Furthermore, the packaging system and method can be used to detect, register, verify and validate that at least one packaged article has or has not experienced has or has not experienced intrusion or product falsification or counterfeiting and read other information that is related to the packaged article(s) and stored by the NFC/RFID integrated circuit over time (e.g., polled by one or more external NFC/RFID interrogators over time). Such operations can be useful as the article is exchanged along a supply chain. The supply chain can include manufacturing, shipping (for an origin to destination with intermediate locations therebetween), warehousing and distribution, retail stores or shops, point of sale terminals, and other arbitrary points along the supply chain.

There have been described and illustrated herein several embodiments of a packaging system that can be used to verify and validate package integrity and related conditions. While particular embodiments of the invention have been described, it is not intended that the invention be limited thereto, as it is intended that the invention be as broad in scope as the art will allow and that the specification be read likewise. Thus, while particular combinations of materials have been disclosed, it will be appreciated that other suitable materials can be used as well. Moreover, while particular configurations have been disclosed in reference to the containers and forms of the packaging, it will be appreciated that other configurations could be used as well. It will therefore be appreciated by those skilled in the art that other modifications could be made to the provided invention without deviating from its spirit and scope as claimed.

What is claimed is:

1. A packaging system for at least one article, comprising:
    a multilayer laminate structure having a conductive layer that is configured to define a set of elongate sections; and
    a first NFC/RFID integrated circuit electrically coupled to an antenna, wherein the first NFC/RFID integrated circuit has a plurality of input terminals electrically coupled to a plurality of electrical circuits that provide for electrical connection or electrical disconnection between sections in the set of elongate sections in accordance with a predefined codeword, wherein the plurality of electrical circuits includes conductive material that provides for electrical connection between adjacent sections in the set of elongate sections;
    wherein the first NFC/RFID integrated circuit is configured to sense voltage signals produced by the plurality of electrical circuits and supplied to the first NFC/RFID integrated circuit via the plurality of input terminals, determine a sensed codeword based on the sensed voltage signals, compare the sense codeword to the predefined codeword, and output a signal based on such comparison.

2. The packaging system of claim 1, wherein:
the conductive material is provided by the same conductive layer that forms the elongate sections of the set.

3. The packaging system of claim 1, wherein:
the predefined codeword is associated with the packaging system for the at least one article or the at least one article.

4. The packaging system of claim 1, wherein:
the signal output by the first NFC/RFID integrated circuit is related to suspected counterfeiting or falsification or intrusion of the at least one article.

5. The packaging system of claim 1, wherein:
the first NFC/RFID integrated circuit includes
    non-volatile memory that stores data representing the predefined codeword in an encrypted or scrambled form, and
    electronic circuitry that reads the data representing the predefined codeword in an encrypted or scrambled form from the non-volatile memory and processes such data to reconstruct the predefined codeword for comparison to the sensed codeword.

6. The packaging system of claim 5, wherein:
the electronic circuitry comprises a controller.

7. The packaging system of claim 1, wherein:
each one of the plurality of electrical circuits includes a resistor network that is electrically-coupled to a corresponding pair of adjacent sections in the set of elongate sections.

8. The packaging system of claim 7, wherein:
the first NFC/RFID integrated circuit includes a positive power supply voltage terminal and a ground power supply terminal; and
the resistor network comprises a first resistor electrically coupled between the positive power supply voltage terminal and one section of the adjacent section pair, a second resistor electrically coupled between the positive power supply voltage terminal and the other section of the adjacent section pair, and a third resistor electrically coupled between the other section of the adjacent section pair and the ground power supply voltage terminal.

9. The packaging system of claim 1, wherein:
the multilayer laminate structure encapsulates a transformative material which is configured to change impedance between first and second conductive layers of the multilayer laminate structure in response to an intrusion or perforation.

10. The packaging system of claim 9, wherein:
the elongate sections of the multilayer laminate structure are electrically coupled to corresponding input terminals of the first NFC/RFID integrated circuit or a second NFC/RFID integrated circuit which is configured to detect the change in impedance between the first and second conductive layers of the multilayer laminate structure due to an intrusion or perforation and output a signal based thereon; or
at least one detection surface that is separate from the elongate sections and defined by one of the first and second conductive layers of the multilayer laminate structure is electrically coupled to a corresponding input terminal of the first NFC/RFID integrated circuit or a second NFC/RFID integrated circuit which is configured to detect the change in impedance between the first and second conductive layers of the multilayer laminate structure due to an intrusion or perforation and output a signal based thereon.

11. The packaging system of claim 10, wherein:
the signal output by the first NFC/RFID integrated circuit or the second NFC/RFID integrated circuit is related to suspected tampering or intrusion of the at least one article.

12. The packaging system of claim 10, wherein:
the set of elongate sections of the multilayer laminate structure that are electrically coupled to the first NFC/RFID integrated circuit and a plurality of detection surfaces that are electrically coupled to the first NFC/RFID integrated circuit or the second NFC/RFID integrated circuit are arranged in an interdigitated layout.

13. The packaging system of claim 10, wherein:
the set of elongate sections of the multilayer laminate structure that are electrically coupled to the first NFC/RFID integrated circuit and the at least one detection surface that is electrically coupled to the second NFC/RFID integrated circuit are arranged in a stacked configuration.

14. The packaging system of claim 10, wherein:
the first NFC/RFID integrated circuit and the second NFC/RFID integrated circuit are both present and arranged in a stacked configuration.

15. The packaging system of claim 10, wherein:
the set of elongate sections of the multilayer laminate structure that are electrically coupled to the first NFC/RFID integrated circuit and the at least one detection surface that is electrically coupled to the second NFC/RFID integrated circuit are arranged in a stacked configuration; and
the first NFC/RFID integrated circuit and the second NFC/RFID integrated circuit are arranged in a stacked configuration.

16. The packaging system of claim 9, wherein:
the multilayer laminate structure has a first configuration that provides a relatively high impedance electrical current path between the first and second conductive layers under normal conditions absent intrusion or perforation; and
the multilayer laminate structure has a second configuration that provides a relatively low impedance electrical current path between the first and second conductive layers in response to the intrusion or perforation.

17. The packaging system of claim 9, wherein:
the transformative material undergoes a state change that changes impedance between the first and second conductive layers in response to the intrusion or perforation.

18. The packaging system of claim 17, wherein:
the transformative material comprises a reactive material that undergoes a physical change or chemical reaction that irreversibly deposits material that forms to a relatively low impedance electrical current path between the first and second conductive layers in response to the intrusion or perforation.

19. The packaging system of claim 18, wherein:
the multilayer laminate structure further includes an encapsulated reagent that reacts with the transformative material to aid the physical change or chemical reaction that irreversibly deposits material that form the relatively low impedance electrical current path between the first and second conductive layers in response to the intrusion or perforation.

20. The packaging system of claim 18, wherein:
the multilayer laminate structure includes microcapsules of the transformative material or microcapsules of the reagent or both, where such microcapsules release encapsulated material or reagent for mixing in response to the intrusion or perforation.

21. The packaging system of claim 9, wherein:
the transformative material comprises metal ions that undergo a galvanic displacement reaction that precipitates solid-phase metal in response to the intrusion, wherein the solid phase metal forms all or part of a low impedance electrical current path between the first and second conductive layers in response to the intrusion or perforation.

22. The packaging system of claim 1, further comprising:
an additional multilayer laminate structure that encapsulates a transformative material between first and second conductive layers; and
a second NFC/RFID integrated circuit electrically coupled to the antenna or additional antenna, wherein the second NFC/RFID integrated circuit is also electrically coupled to the first and second conductive layers of the additional multilayer laminate structure, wherein the transformative material is configured to change impedance between the first and second conductive layers in response to an intrusion or perforation, and wherein at least one operational characteristic of the second NFC/RFID integrated circuit is dependent on the change in impedance between the first and second conductive layers of the additional multilayer laminate structure due to an intrusion or perforation.

23. The packaging system of claim 1, wherein:
the first NFC/RFID integrated circuit further includes decode circuitry and a register, wherein the decode circuitry is configured to decode the voltage signals supplied by the plurality of electrical circuits to generate the sensed codeword, and wherein the register is configured to store the sensed codeword generated by the decode circuitry.

24. The packaging system of claim 22, wherein:
the additional multilayer laminate structure includes at least one detection surface defined by one of the first and second conductive layers of the additional multilayer laminate structure; and
the second NFC/RFID integrated circuit has at least one input terminal that is electrically coupled to the at least one detection surface, wherein the second NFC/RFID integrated circuit is configured to detect the change in impedance between the first and second conductive layers of the separate multilayer laminate structure due to an intrusion or perforation in the at least one detection surface and output a signal based thereon.

25. The packaging system of claim 24, wherein:
the signal output by the second NFC/RFID integrated circuit is related to suspected tampering of the at least one article.

26. The packaging system of claim 24, wherein:
the set of elongate sections of the multilayer laminate structure that are electrically coupled to the first NFC/RFID integrated circuit and the at least one detection surface that is electrically coupled to the second NFC/RFID integrated circuit are arranged in a stacked configuration.

27. The packaging system of claim 24, wherein:
the first NFC/RFID integrated circuit and the second NFC/RFID integrated circuit are arranged in a stacked configuration.

28. The packaging system of claim 24, wherein:
the set of elongate sections of the multilayer laminate structure that are electrically coupled to the first NFC/RFID integrated circuit and the at least one detection surface that is electrically coupled to the second NFC/RFID integrated circuit are arranged in a stacked configuration; and
the first NFC/RFID integrated circuit and the second NFC/RFID integrated circuit are arranged in a stacked configuration.

29. The packaging system of claim 1, wherein:
the NFC/RFID integrated circuit is a passive NFC/RFID integrated circuit that cooperates with the antenna to receive and store electrical power from electromagnetic radiation emitted by an external NFC/RFID interrogator.

30. The packaging system of claim 1, which is configured as a sensing barrier or surface that protects at least one article, wherein:
the first NFC/RFID integrated circuit is configured to detect and register suspected counterfeiting or falsification or intrusion of the at least one article.

31. The packaging system of claim 1, wherein:
the at least one article is selected from the group consisting of
medicine
foods or beverages
chemicals
forensics samples
electronics
electro-mechanical products
branded products
lifestyle personal products
documents or works of art
plastics or rubbers
fabrics or leather goods
wood
combinations of these products or other products thereof.

32. A method of monitoring at least one packaged article, comprising:
i) providing a packaging system of claim 1; and
ii) employing an NFC/RFID interrogator to configure the first NFC/RFID integrated circuit of the packaging system to detect and register suspected counterfeiting or falsification of the at least one article.

33. A method according to claim 32, further comprising:
iii) repeating the operations of ii) at multiple points in time to detect and register suspected counterfeiting or falsification of the at least one article over time.

34. A method according to claim 33, wherein:
the multiple points in time are along the supply chain such that the first NFC/RFID integrated circuit of the packaging system detects and registers suspected counterfeiting or falsification of the at least one article along the supply chain.

35. A method according to claim 32, wherein:
the multilayer laminate structure or another multilayer laminate structure of the packaging system encapsulates a transformative material between first and second conductive layers, wherein the transformative material is configured to change impedance between the first and second conductive layers in response to an intrusion or perforation in the multilayer laminate structure;
the packaging system optionally includes a second NFC/RFID integrated circuit electrically coupled to the antenna or additional antenna, wherein the first NFC/RFID integrated circuit or the second NFC/RFID integrated circuit is electrically coupled to the first and second conductive layers; and
an NFC/RFID interrogator is employed to configure the first NFC/RFID integrated circuit or the second NFC/RFID integrated circuit to detect and register an intrusion or perforation in the multilayer laminate structure that is related to suspected tampering of the at least one article.

36. A packaging system for at least one article, comprising:
a first multilayer laminate structure having a conductive layer that is configured to define a set of elongate sections;
a first NFC/RFID integrated circuit electrically coupled to an antenna, wherein the first NFC/RFID integrated circuit has a plurality of input terminals electrically coupled to a plurality of electrical circuits that provide for electrical connection or electrical disconnection between sections in the set of elongate sections in accordance with a predefined codeword, wherein the plurality of electrical circuits includes conductive material that provides for electrical connection between adjacent sections in the set of elongate sections, and wherein the first NFC/RFID integrated circuit is configured to sense voltage signals produced by the plurality of electrical circuits and supplied to the first NFC/RFID integrated circuit via the plurality of input terminals, determine a sensed codeword based on the sensed voltage signals, compare the sense codeword to the predefined codeword, and output a signal based on such comparison;
a second multilayer laminate structure that encapsulates a transformative material between first and second conductive layers, wherein the transformative material is configured to change impedance between the first and second conductive layers in response to an intrusion or perforation in the second multilayer laminate structure; and
a second NFC/RFID integrated circuit electrically coupled to the antenna or additional antenna, wherein the second NFC/RFID integrated circuit is electrically coupled to the first and second conductive layers of the second multilayer laminate structure, wherein the second NFC/RFID integrated circuit is configured to output a signal based on an intrusion or perforation in the second multilayer laminate structure.

37. The packaging system of claim 36, wherein:
a signal output by the first NFC/RFID integrated circuit is related to suspected counterfeiting or falsification of the at least one article; and
a signal output by the second NFC/RFID integrated circuit is related to suspected tampering or intrusion of the at least one article.

38. The packaging system of claim 36, wherein:
first multilayer laminate structure and the first NFC/RFID integrated circuit are arranged in a stacked configuration above or below the second multilayer laminate structure and the second NFC/RFID integrated circuit.

39. The packaging system of claim 36, which is formed in a sheet or rolled form.

* * * * *